(12) United States Patent
Uchida et al.

(10) Patent No.: US 10,648,618 B2
(45) Date of Patent: May 12, 2020

(54) FUEL GAS FILLING SYSTEM AND FUEL GAS FILLING METHOD

(71) Applicant: NISSAN MOTOR CO., LTD., Yokohama-shi, Kanagawa (JP)

(72) Inventors: Hiroshi Uchida, Kanagawa (JP); Tomofumi Yoshinaga, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 587 days.

(21) Appl. No.: 15/308,170

(22) PCT Filed: Apr. 30, 2015

(86) PCT No.: PCT/JP2015/063031
§ 371 (c)(1),
(2) Date: Nov. 1, 2016

(87) PCT Pub. No.: WO2015/170670
PCT Pub. Date: Nov. 12, 2015

(65) Prior Publication Data
US 2017/0059089 A1    Mar. 2, 2017

(30) Foreign Application Priority Data

May 7, 2014   (JP) .................................. 2014-096383

(51) Int. Cl.
*F17C 5/06*       (2006.01)
*F17C 13/02*      (2006.01)

(52) U.S. Cl.
CPC ................ *F17C 5/06* (2013.01); *F17C 13/02* (2013.01); *F17C 13/025* (2013.01);
(Continued)

(58) Field of Classification Search
CPC .......... F17C 5/06; F17C 13/02; F17C 13/025; F17C 13/026; F17C 2250/0434;
(Continued)

(56) References Cited

U.S. PATENT DOCUMENTS 5,361,796 A * 11/1994 Mutter ................ F16K 11/0743
137/14
5,810,058 A *  9/1998 Kountz .................... F17C 5/06
141/18

(Continued)

FOREIGN PATENT DOCUMENTS

EP        1 398 603 A2    3/2004
JP      2002081347 A *    3/2002
(Continued)

*Primary Examiner* — Timothy L Maust
*Assistant Examiner* — James R Hakomaki
(74) *Attorney, Agent, or Firm* — Foley & Lardner LLP

(57) ABSTRACT

A fuel gas filling system detects at least one of a pressure of fuel gas supplied from a filling device and a temperature of the fuel gas in a fuel tank of a vehicle and determines whether or not there is a gas state fluctuation in which the pressure or temperature of the fuel gas suddenly changes. The fuel gas filling system executes either one of a first filling control of filling the fuel gas into the vehicle on the basis of at least one of the fuel gas pressure and the fuel gas temperature and a second filling control according to the gas state fluctuation. This system executes the first filling control in normal time and executes the second filling control of filling the fuel gas without using a fuel gas pressure detected by fuel gas state detection unit or the second filling control of filling the fuel gas without using a fuel gas temperature detected by the fuel gas state detection unit when it is determined by gas state fluctuation determination unit that there is the gas state fluctuation.

19 Claims, 12 Drawing Sheets

(52) U.S. Cl.
CPC ...... *F17C 13/026* (2013.01); *F17C 2221/012* (2013.01); *F17C 2227/04* (2013.01); *F17C 2250/03* (2013.01); *F17C 2250/0434* (2013.01); *F17C 2250/0439* (2013.01); *F17C 2250/0694* (2013.01); *F17C 2260/02* (2013.01); *F17C 2270/0184* (2013.01); *Y02E 60/321* (2013.01)

(58) Field of Classification Search
CPC ............ F17C 2221/012; F17C 2227/04; F17C 2250/03; F17C 2250/0439; F17C 2250/0694; F17C 2260/02; F17C 2270/0184; Y02E 60/321
USPC ......................................................... 141/100
See application file for complete search history.

(56) References Cited

U.S. PATENT DOCUMENTS

| | | | | |
|---|---|---|---|---|
| 6,886,398 B2* | 5/2005 | Tsuyuki | ............. | F02M 25/0818 73/114.38 |
| 9,810,734 B2* | 11/2017 | Maeda | ..................... | G01P 21/00 |
| 9,845,917 B2* | 12/2017 | Allidieres | ............... | F17C 5/007 |
| 9,933,114 B2* | 4/2018 | Thiessen | ................... | F17C 5/06 |
| 2002/0170347 A1* | 11/2002 | Stabile | .................... | F17C 13/02 73/149 |
| 2003/0150510 A1 | 8/2003 | Cohen et al. | | |
| 2003/0209282 A1* | 11/2003 | Satou | ........................ | F17C 5/00 141/97 |
| 2006/0110640 A1* | 5/2006 | Yoshida | ............ | H01M 8/04097 429/429 |
| 2007/0051423 A1* | 3/2007 | Handa | ....................... | F17C 5/00 141/94 |
| 2007/0193340 A1* | 8/2007 | Yoshida | ............ | H01M 8/04231 73/46 |
| 2007/0257043 A1* | 11/2007 | Kanoya | .................... | F17C 5/06 220/581 |
| 2009/0151812 A1* | 6/2009 | Allidieres | ............... | F17C 5/007 141/11 |
| 2010/0307636 A1* | 12/2010 | Uemura | .................... | F17C 5/06 141/4 |
| 2012/0111447 A1* | 5/2012 | Mori | ......................... | F17C 5/06 141/4 |
| 2012/0267002 A1* | 10/2012 | Kittilsen | .................. | F17C 5/06 141/4 |
| 2012/0298256 A1* | 11/2012 | Mori | ....................... | F17C 5/007 141/94 |
| 2013/0014854 A1* | 1/2013 | Mori | ....................... | F17C 5/007 141/1 |
| 2013/0014855 A1* | 1/2013 | Yahashi | ................... | G01M 3/26 141/1 |
| 2013/0037165 A1* | 2/2013 | Okawachi | ................ | F17C 5/06 141/4 |
| 2013/0206257 A1* | 8/2013 | Okawachi | ........... | F16K 31/0655 137/551 |
| 2013/0244124 A1* | 9/2013 | Wake | .................... | F02D 19/025 429/414 |
| 2013/0268130 A1* | 10/2013 | Adler | ....................... | F17C 5/007 700/283 |
| 2014/0295305 A1* | 10/2014 | Wake | ................ | H01M 8/04223 429/429 |
| 2014/0299101 A1* | 10/2014 | Melanson | ................. | F17C 5/06 123/445 |
| 2014/0345576 A1* | 11/2014 | Furuhata | ............ | F02M 25/0809 123/520 |
| 2015/0020918 A1* | 1/2015 | MacAluso | ................ | F17C 5/06 141/11 |
| 2015/0090364 A1* | 4/2015 | Elgowainy | ................ | F17C 5/06 141/4 |
| 2015/0184804 A1* | 7/2015 | Handa | ................... | F17C 13/028 141/1 |

FOREIGN PATENT DOCUMENTS

| | | | |
|---|---|---|---|
| JP | 2005273811 A | * | 10/2005 |
| JP | 2006-214512 A | | 8/2006 |
| JP | 4071648 B2 | | 4/2008 |
| JP | 2010-266023 A | | 11/2010 |
| JP | 2010-286015 A | | 12/2010 |

* cited by examiner

FUEL GAS FILLING SYSTEM AND FUEL GAS FILLING METHOD

TECHNICAL FIELD

The present invention relates to a fuel gas filling system and a fuel gas filling method for filling fuel gas into a vehicle.

BACKGROUND ART

A hydrogen filling system for filling hydrogen gas stored in a storage tank into a fuel tank of a fuel cell vehicle is disclosed in Publication of Japanese Patent No. 4071648.

SUMMARY OF INVENTION

Such a hydrogen filling system generally includes a plurality of storage tanks for storing hydrogen gas and a dispenser (filling device) to be selectively connected to any one of the storage tanks and configured to fill the hydrogen gas into a fuel tank of a vehicle.

Hydrogen filling by the hydrogen filling system is performed, utilizing a differential pressure of hydrogen gas between the storage tank and the fuel tank of the vehicle. Hydrogen filling is performed until a hydrogen pressure reaches a filling stop pressure while the pressure of hydrogen supplied from the dispenser and the like are monitored.

In the hydrogen filling system described above, connection between the dispenser and the storage tank may be, for example, switched during hydrogen filling. Since high-pressure hydrogen gas in the storage tank is supplied to the dispenser immediately after such a tank switch, the pressure of the hydrogen gas in the dispenser temporarily suddenly increases due to pressure losses such as in a piping and joints provided in the dispenser. When the hydrogen pressure on the dispenser side temporarily increases after hydrogen filling has proceeded to a certain extent, this hydrogen pressure reaches the filling stop pressure and hydrogen filling is finished (erroneous stop) although a desired amount of the hydrogen gas has not been filled into the fuel tank.

Further, during hydrogen filling, a leak determination control of determining the presence or absence of hydrogen gas leakage may be executed, for example, by forming a gas supply path from the dispenser to the fuel tank into a closed circuit. During the execution of such a leak determination control, the supply of the hydrogen gas is stopped, whereby a hydrogen temperature in the fuel tank temporarily decreases. When the hydrogen temperature in the fuel tank temporarily decreases, a hydrogen filling rate calculated on the basis of the hydrogen temperature in the fuel tank increases and may reach a filling stop filling rate. As a result, hydrogen filling is finished (erroneous stop) although the desired amount of the hydrogen gas has not been filled into the fuel tank.

As described above, the conventional hydrogen filling system (fuel gas filling system) has a problem that the hydrogen gas as fuel gas cannot be efficiently filled into the fuel tank of the vehicle in the event of a gas state fluctuation in which a state (pressure or temperature) of the hydrogen gas suddenly changes.

The present invention aims to provide a fuel gas filling system and a fuel gas filling method capable of efficiently filling fuel gas into a fuel tank of a vehicle.

According to an aspect of this invention, a fuel gas filling system including a plurality of storage tanks for storing fuel gas and a filling device configured to be selectively connected to the storage tanks and fill the fuel gas supplied from the storage tanks into a fuel tank of a vehicle is provided. The fuel gas filling system includes a fuel gas state detection unit configured to detect at least one of a pressure of the fuel gas supplied from the filling device and a temperature of the fuel gas in the fuel tank of the vehicle, a gas state fluctuation determination unit configured to determine whether or not there is a gas state fluctuation, the pressure or temperature of the fuel gas supplied from the filling device suddenly changing in the gas state fluctuation, and a filling control unit configured to execute either one of a first filling control of filling the fuel gas into the vehicle from the filling device on the basis of at least one of the fuel gas pressure and the fuel gas temperature detected by the fuel gas state detection unit and a second filling control according to the gas state fluctuation. The filling control unit executes the first filling control in normal time and executes the second filling control of filling the fuel gas without using the fuel gas pressure detected by the fuel gas state detection unit or the second filling control of filling the fuel gas without using the fuel gas temperature detected by the fuel gas state detection unit when it is determined by the gas state fluctuation determination unit that there is the gas state fluctuation.

DESCRIPTION OF EMBODIMENTS

Hereinafter, embodiments of the present invention are described with reference to drawings and the like.

First Embodiment

Figure 1:
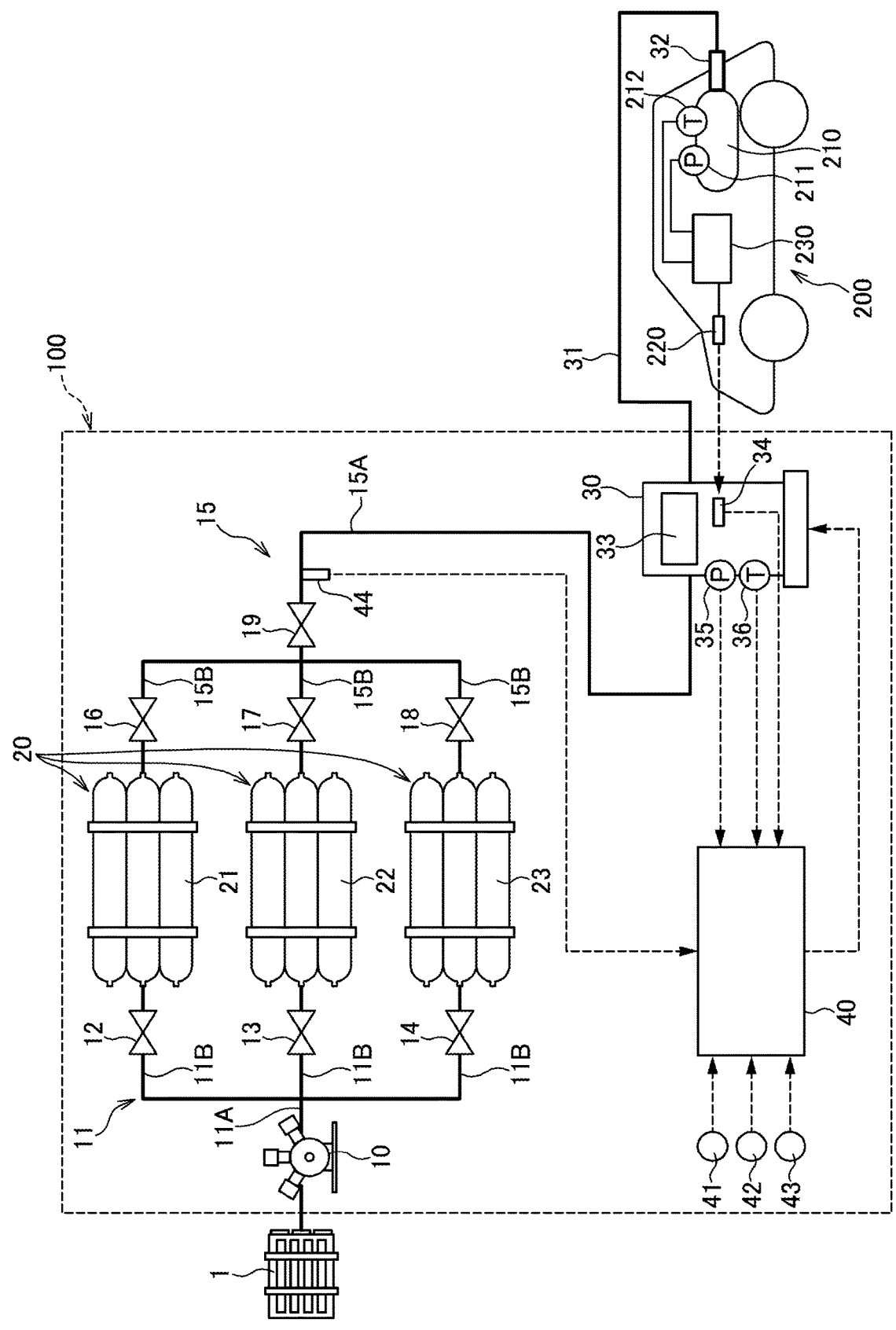
FIG. 1 is a schematic configuration diagram of a hydrogen filling system according to a first embodiment of the present invention.

FIG. 1 is a schematic configuration diagram of a hydrogen filling system according to a first embodiment of the present invention.

A hydrogen filling system 100 shown in FIG. 1 is a fuel gas filling system for filling hydrogen gas as fuel gas into a fuel tank 210 of a fuel cell vehicle 200, i.e. a so-called hydrogen gas station. The hydrogen filling system 100 includes a compressor 10, a plurality of storage tanks 20 for storing the hydrogen gas, a dispenser 30 for filling the hydrogen gas supplied from the storage tanks 20 into the fuel tank 210 of the vehicle 200 and a controller 40 for integrally controlling this system.

In the hydrogen filling system 100, the hydrogen gas is stored in the plurality of storage tanks 20 and these storage tanks 20 are composed of a low-pressure storage tank 21, a medium-pressure storage tank 22 and a high-pressure storage tank 23. A first pressure sensor 41 for detecting a pressure of the hydrogen gas in the low-pressure storage tank 21 is provided in this tank. Further, a second pressure sensor 42 for detecting a pressure of the hydrogen gas in the medium-pressure storage tank 22 is provided in this tank and a third pressure sensor 43 for detecting a pressure of the hydrogen gas in the high-pressure storage tank 23 is provided in this tank.

The low-pressure storage tank 21, the medium-pressure storage tank 22 and the high-pressure storage tank 23 are connected to the compressor 10 via a piping 11. The compressor 10 is a pump for compressing and supplying the hydrogen gas to each of the storage tanks 21, 22 and 23. The piping 11 includes a main flow passage 11A having an upstream end connected to the compressor 10 and branch flow passages 11B branched off from a downstream end of the main flow passage 11A and connected to inlet parts of the respective storage tanks 21, 22 and 23.

A first upstream on-off valve 12 for opening and closing the flow passage is provided in the branch flow passage 11B connected to the low-pressure storage tank 21. Further, a second upstream on-off valve 13 for opening and closing the branch flow passage 11B is provided in the flow passage connected to the medium-pressure storage tank 22 and a third upstream on-off valve 14 for opening and closing the branch flow passage 11B is provided in the flow passage connected to the high-pressure storage tank 23. Openings (Opening degrees) of these on-off valves 12, 13 and 14 are controlled by the controller 40.

Furthermore, the low-pressure storage tank 21, the medium-pressure storage tank 22 and the high-pressure storage tank 23 are connected to the dispenser 30 via a piping 15. The piping 15 includes a main flow passage 15A having a downstream end connected to the dispenser 30 and branch flow passages 15B branched off from an upstream end of the main flow passage 15A and connected to outlet parts of the respective storage tanks 21, 22 and 23.

A first downstream on-off valve 16 for opening and closing the flow passage is provided in the branch flow passage 15B connected to the low-pressure storage tank 21. Further, a second downstream on-off valve 17 for opening and closing the flow passage is provided in the branch flow passage 15B connected to the medium-pressure storage tank 22 and a third downstream on-off valve 18 for opening and closing the flow passage is provided in the branch flow passage 15B connected to the high-pressure storage tank 23. Furthermore, a flow rate regulating valve 19 for regulating a flow rate of the hydrogen gas supplied to the dispenser 30 from each storage tank 21, 22, 23 is provided in the main flow passage 15A of the piping 15. Openings (Opening degrees) of these on-off valves 16, 17 and 18 and the flow rate regulating valve 19 are controlled by the controller 40. It should be noted that a flow rate sensor 44 (a gas flow rate detection unit) for detecting a flow rate of the hydrogen gas flowing in the main flow passage 15A is provided in the main flow passage 15A of the piping 15. The flow rate sensor 44 may be provided in the dispenser 30 to be described later.

The hydrogen filling system 100 is configured to store hydrogen gas stored in a tank for transportation 1 transported such as by a trailer in each storage tank 21, 22, 23 if necessary. A hydrogen pressure in the tank for transportation 1 is set at about 20 MPa and the hydrogen gas from the tank for transportation 1 is pressurized and compressed by the compressor 10 and supplied to each storage tank 21, 22, 23.

In the case of storing the hydrogen gas in the low-pressure storage tank 21, the hydrogen gas is supplied to the low-pressure storage tank 21 by the compressor 10 with only the first upstream on-off valve 12 opened and the other on-off valves 13, 14, 16, 17 and 18 closed. Further, in the case of storing the hydrogen gas in the medium-pressure storage tank 22, the hydrogen gas is supplied to the medium-pressure storage tank 22 by the compressor 10 with only the second upstream on-off valve 13 opened and the other on-off valves 12, 14, 16, 17 and 18 closed. Furthermore, in the case of storing the hydrogen gas in the high-pressure storage tank 23, the hydrogen gas is supplied to the high-pressure storage tank 23 by the compressor 10 with only the third upstream on-off valve 14 opened and the other on-off valves 12, 13, 16, 17 and 18 closed. In the present embodiment, hydrogen gas storage upper limit pressures of the low-pressure storage tank 21, the medium-pressure storage tank 22 and the high-pressure storage tank 23 are respectively set at 40 MPa, 60 MPa and 80 MPa.

It should be noted that although the hydrogen filling system 100 is configured as an off-site system for storing already produced hydrogen gas in each storage tank 21, 22, 23, it may be configured as an on-site system for storing hydrogen gas produced in the system in each storage tank 21, 22, 23.

Next, the dispenser 30 constituting the hydrogen filling system 100 is described with reference to FIG. 1.

The dispenser 30 is a filling device selectively connected to any one of the low-pressure storage tank 21, the medium-pressure storage tank 22 and the high-pressure storage tank 23 to fill the hydrogen gas supplied from the connected tank into the fuel tank 210 of the vehicle 200. The dispenser 30 includes a filling hose 31, a filling nozzle 32 provided on the tip of the filling hose 31, a display unit 33 for displaying hydrogen gas filled state information and the like and a receiver 34 for receiving vehicle-side information transmitted from the vehicle 200.

The dispenser 30 is connected to any one of the low-pressure storage tank 21, the medium-pressure storage tank 22 and the high-pressure storage tank 23 and fills the hydrogen gas into the fuel tank 210, utilizing a differential pressure between a hydrogen pressure in the connected tank and a hydrogen pressure in the fuel tank 210 of the vehicle 200. The hydrogen gas from the dispenser 30 is supplied into the vehicle 200 through the filling hose 31 and the filling nozzle 32. The filling nozzle 32 is configured to be attachable to and detachable from a filling port of the fuel tank 210 of the vehicle 200. It should be noted that the dispenser 30 includes a system-side pressure sensor 35 (a gas state detection unit) for detecting a pressure of the hydrogen gas supplied from the dispenser 30 (hydrogen pressure in the dispenser 30) and a system-side temperature sensor 36 for detecting a temperature of the hydrogen gas supplied from the dispenser 30 (hydrogen temperature in the dispenser 30).

The display unit 33 is a display for displaying the hydrogen gas filling state information and arranged on an upper part of the front surface of the dispenser 30. A hydrogen gas filling status, a filling end estimated time and the like are displayed as the filling state information on the display unit 33. It should be noted that the display unit 33 may be configured as a touch-panel type display so that parameters relating to the end of hydrogen filling such as a target hydrogen filling amount and filling charge and the like can be arbitrarily set.

The dispenser 30 is configured to be able to receive the vehicle-side information via the receiver 34. That is, the receiver 34 of the dispenser 30 of the hydrogen filling system 100 and a transmitter 220 of the vehicle 200 stopped for hydrogen filling conduct infrared communication at a time interval of 100 msec, and the vehicle-side information transmitted from the transmitter 220 of the vehicle 200 is received by the receiver 34 of the dispenser 30. It should be noted that the transmitter 220 on the vehicle side may be provided near the filling port of the fuel tank 210, the receiver 34 on the dispenser side may be provided on the filling nozzle 32 and the transmitter 220 and the receiver 34 may be configured to start the infrared communication when the filling nozzle 32 is connected to the filling port of the fuel tank 210.

The vehicle 200 includes a vehicle controller 230 connected to the transmitter 220 and an infrared communication control from the transmitter 220 to the receiver 34 of the dispenser 30 is executed by the vehicle controller 230. To the vehicle controller 230 are input detection signals of a vehicle-side pressure sensor 211 (a vehicle-side pressure detection unit) for detecting the pressure of the hydrogen gas in the fuel tank 210 and a vehicle-side temperature sensor 212 (a gas state detection unit) for detecting a temperature of the hydrogen gas in the fuel tank 210.

The vehicle-side information transmitted from the transmitter 220 of the vehicle 200 to the receiver 34 of the dispenser 30 includes fixed information and variable information. The fixed information includes protocol information for discriminating infrared communication standards, version information of communication software used in the vehicle controller 230, pressure specification information of the fuel tank 210, tank volume information and the like. The variable information includes filling propriety information indicating the presence or absence of a state where the hydrogen gas can be filled into the fuel tank 210, and hydrogen pressure information, hydrogen temperature information and the like in the fuel tank 210 detected by the vehicle-side pressure sensor 211 and the vehicle-side temperature sensor 212.

The hydrogen filling control of the hydrogen filling system 100 for the vehicle 200 is executed by the controller 40 on the system side. The controller 40 is configured as a microcomputer including a central processing unit (CPU), a read-only memory (ROM), a random access memory (RAM) and an input/output interface (I/O interface).

Vehicle-side information received by the receiver 34 of the dispenser 30 other than detection signals from the first to third pressure sensors 41 to 43, the flow rate sensor 44, the system-side pressure sensor 35, the system-side temperature sensor 36 and the like are input into the controller 40. The controller 40 executes the hydrogen filling control on the basis of these pieces of input information.

Figure 2:
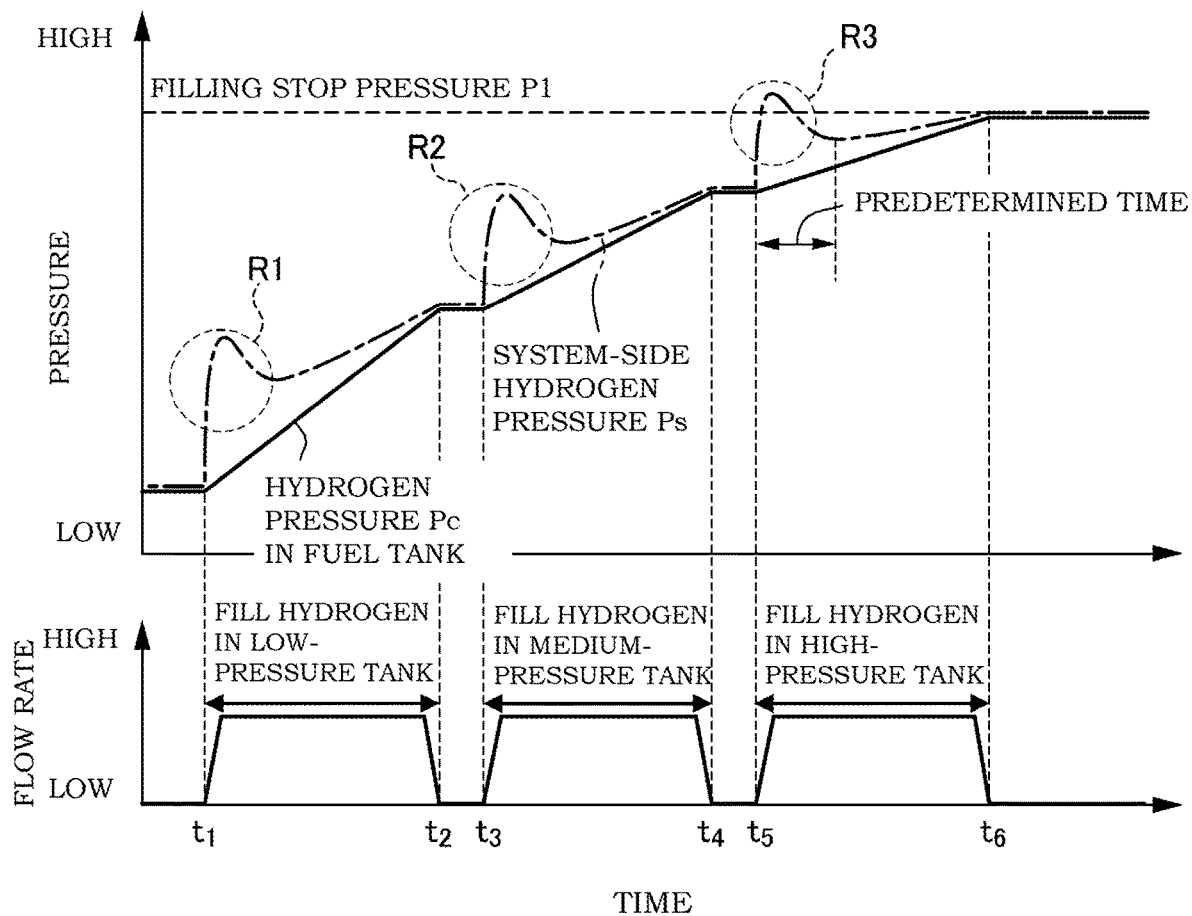
FIG. 2 is a timing chart showing changes of a pressure and a flow rate of hydrogen gas supplied from a dispenser and a change of a pressure of the hydrogen gas in a fuel tank of a vehicle.

The flow of the hydrogen filling control is described with reference to FIG. 2. FIG. 2 is a timing chart showing a change of the hydrogen pressure detected by the system-side pressure sensor 35, a change of the hydrogen flow rate detected by the flow rate sensor 44 and a change of the hydrogen pressure in the fuel tank 210 of the vehicle 200. FIG. 2 is a chart illustrating a case of fully filling the hydrogen gas into the fuel tank 210 in an almost empty state.

Hydrogen filling by the hydrogen filling system 100 is performed after the filling nozzle 32 of the dispenser 30 is set on the filling port of the fuel tank 210 of the vehicle 200 stopped for hydrogen filling.

When hydrogen filling is started at time t1, the first downstream on-off valve 16 and the flow rate regulating valve 19 are opened and the other on-off valves 12, 13, 14, 17 and 18 are closed, whereby the hydrogen gas from the low-pressure storage tank 21 is supplied to the vehicle 200 via the dispenser 30. Utilizing a differential pressure of the hydrogen gas between the low-pressure storage tank 21 and the fuel tank 210 of the vehicle 200, hydrogen filling is performed until that differential pressure reaches a low-pressure threshold value. The hydrogen gas supplied to the vehicle from the side of the hydrogen filling system 100 is controlled to have a fixed flow rate by the flow rate regulating valve 19. That is, the flow rate regulating valve 19 is feedback-controlled on the basis of the hydrogen flow rate detected by the flow rate sensor 44.

At time t2 at which the differential pressure of the hydrogen gas between the low-pressure storage tank 21 and the fuel tank 210 reaches the low-pressure threshold value, the first downstream on-off valve 16 is closed and, then, the second downstream on-off valve 17 is opened at time t3. In this way, the hydrogen gas from the medium-pressure storage tank 22 is supplied to the vehicle 200 via the dispenser 30 and hydrogen filling is performed until a differential pressure of the hydrogen gas between the medium-pressure storage tank 22 and the fuel tank 210 of the vehicle 200 reaches a medium-pressure threshold value at time t4.

At time t4, the second downstream on-off valve 17 is closed and, then, the third downstream on-off valve 18 is opened at time t5. In this way, the hydrogen gas from the high-pressure storage tank 23 is supplied to the vehicle 200 via the dispenser 30, utilizing a differential pressure of the hydrogen gas between the high-pressure storage tank 23 and the fuel tank 210 of the vehicle 200. Hydrogen filling by the hydrogen gas of the high-pressure storage tank 23 is continued until the pressure of the hydrogen gas supplied from the dispenser 30 to the vehicle 200, i.e. a hydrogen pressure Ps detected by the system-side pressure sensor 35 reaches a filling stop pressure P1 (e.g. 70 MPa). As just described, the hydrogen filling system 100 is configured to make a filling stop judgment on the basis of the system-side hydrogen pressure Ps.

As described above, in the hydrogen filling system 100, the pressure of the hydrogen gas supplied from the system side to the vehicle 200 is increased in a stepwise manner by successively connecting the dispenser 30 to the low-pressure storage tank 21, the medium-pressure storage tank 22 and the high-pressure storage tank 23 during hydrogen filling. In such a hydrogen filling system 100, the high-pressure hydrogen gas in each storage tank 21, 22, 23 is supplied to the dispenser 30 immediately after a tank switch. Thus, the pressure of the hydrogen gas in the dispenser 30 temporarily increases rapidly as shown in broken-line regions R1 to R3 of FIG. 2. A sudden increase of the system-side hydrogen pressure when the storage tank is switched is due to pressure losses in the pipings in the dispenser 30, the filling hose 31 and joints connecting the pipings and the like. However, the influence of the pressure fluctuation as described above is suppressed beyond the filling nozzle 32 and a temporary sudden increase of the hydrogen pressure and the like hardly occur in the fuel tank 210.

In such a hydrogen filling system 100, the hydrogen pressure may exceed the filling stop pressure P1 due to a temporary sudden increase (see broken-line region R3 of FIG. 2) of the system-side hydrogen pressure immediately after the tank switch particularly in the case of a switch to the high-pressure storage tank 23. In this case, the hydrogen filling by the hydrogen filling system 100 is finished (erroneous stop) although a planned amount of the hydrogen gas has not been filled into the fuel tank 210 of the vehicle 200.

Accordingly, in the hydrogen filling system 100 according to the present embodiment, a hydrogen filling control is executed in consideration of a sudden change of the system-side hydrogen pressure (gas state) such as when the storage tank is switched in order to prevent the occurrence of an erroneous stop of hydrogen filling as described above.

Figure 3:
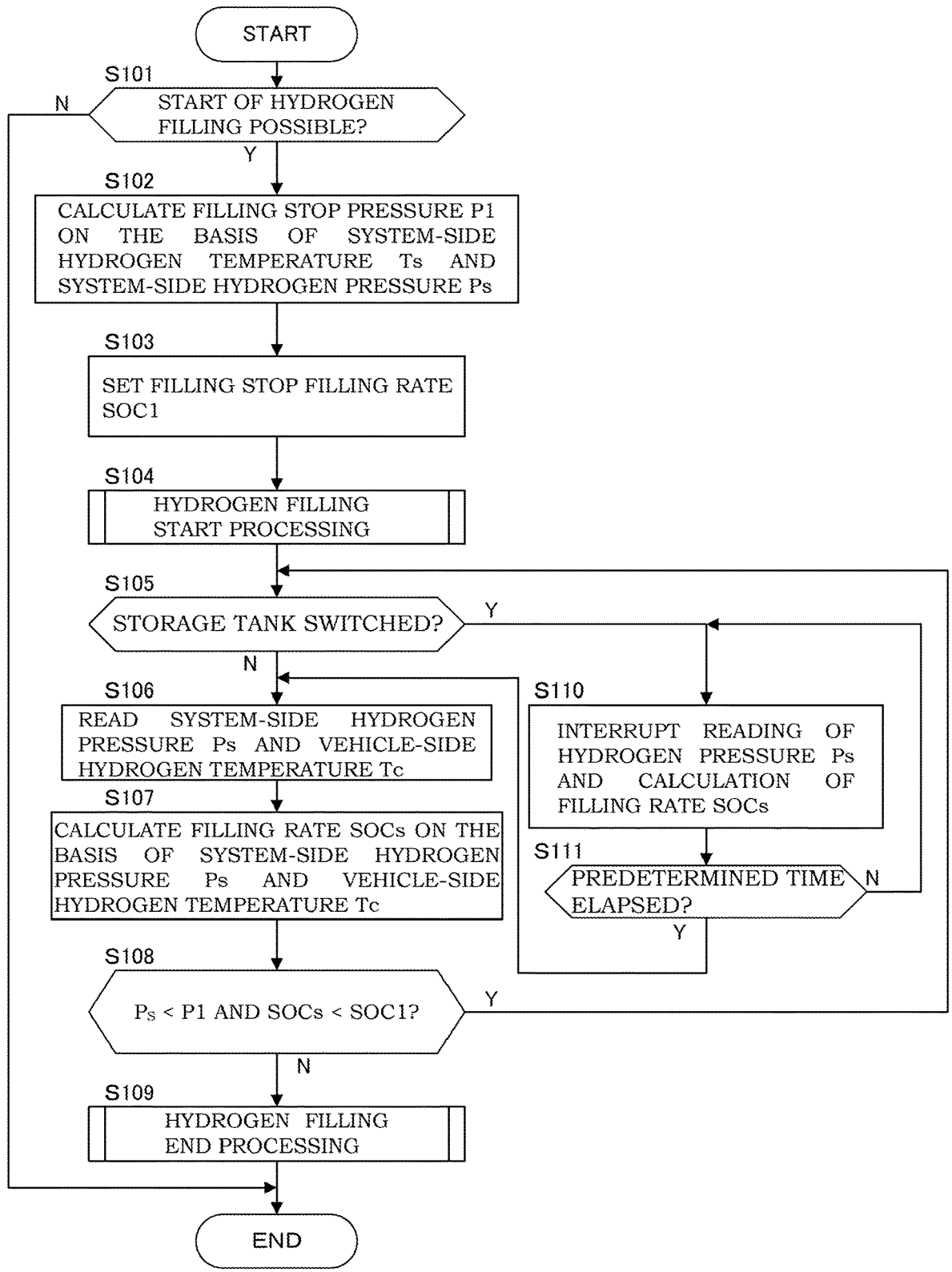
FIG. 3 is a flow chart showing a hydrogen filling control executed by a controller of the hydrogen filling system.

The hydrogen filling control in the hydrogen filling system 100 is described in detail with reference to FIG. 3. FIG. 3 is a flow chart showing the hydrogen filling control executed by the controller 40 of the hydrogen filling system 100. The hydrogen filling control is started when the filling nozzle 32 of the dispenser 30 is connected to the filling port of the fuel tank 210 of the vehicle 200.

In S101, the controller 40 determines whether or not hydrogen filling can be started by the hydrogen filling system 100. For example, the controller 40 confirms whether or not various pieces of data included in the vehicle-side information received by the receiver 34 of the dispenser 30 conform to the hydrogen filling system 100 and determines whether or not to start hydrogen filling.

When it is determined in S101 that hydrogen filling cannot be started, the controller 40 finishes the hydrogen filling control. In contrast, when it is determined in S101 that hydrogen filling can be started, the controller 40 performs a process of S102.

In S102, the controller 40 calculates the filling stop pressure P1 serving as a reference value for stopping hydrogen filling on the basis of a hydrogen temperature Ts detected by the system-side temperature sensor 36 and the hydrogen pressure Ps detected by the system-side pressure sensor 35. Before the start of hydrogen filling, the hydrogen temperature Ts detected by the system-side temperature sensor 36 reaches an environmental temperature (outside temperature) and before the start of hydrogen filling, the hydrogen pressure Ps detected by the system-side pressure sensor 35 reaches an initial pressure in the fuel tank 210 of the vehicle 200. The outside temperature may be detected by a temperature sensor provided separately from the system-side temperature sensor 36 and the initial pressure in the fuel tank 210 may be detected by a pressure sensor provided separately from the system-side pressure sensor 35.

It should be noted that the filling stop pressure P1 is calculated, for example, as a pressure of the hydrogen gas in the fuel tank 210 when the fuel tank 210 is fully filled. The filling stop pressure P1 may be calculated as a value which changes according to the amount of hydrogen required to be filled into the fuel tank 210 by a driver or the like.

In S103, the controller 40 sets a filling stop filling rate SOC1 [%] serving as a reference value for stopping hydrogen filling such as according to the specifications of the fuel tank 210 of the vehicle 200. The filling stop filling rate SOC1 is, for example, a rate of the hydrogen gas in the fuel tank 210 when the fuel tank 210 is fully filled. The filling stop filling rate SOC1 may be set as a value which changes according to the amount of hydrogen required to be filled into the fuel tank 210 by the driver or the like.

In S104, the controller 40 performs a hydrogen filling start process by opening the first downstream on-off valve 16 and the flow rate regulating valve 19. In this way, the filling of the hydrogen gas into the fuel tank 210 of the vehicle 200 is started from the dispenser 30 of the hydrogen filling system 100. Although a case where the low-pressure storage tank 21 and the dispenser 30 are connected to start hydrogen filling is described here, hydrogen filling may be started by connecting the dispenser 30 to the medium-pressure storage tank 22 or the high-pressure storage tank 23 depending on the hydrogen pressure in the fuel tank 210 of the vehicle 200.

In S105, the controller 40 determines whether or not the connection of the dispenser 30 to each storage tank 21, 22, 23 has been switched. The controller 40 detects the presence or absence of the storage tank switch on the basis of valve open states of the first to third downstream on-off valves 16 to 18. For example, the controller 40 determines a switch from the low-pressure storage tank 21 to the medium-pressure storage tank 22 when the first downstream on-off valve 16 is closed and the second downstream on-off valve 17 in a closed state is opened. S105 is a process of determining whether or not there is a gas state fluctuation (see broken-line regions R1 to R3 of FIG. 2) in which the system-side hydrogen pressure temporarily suddenly increases, i.e. a process to determine the presence or absence of the gas state fluctuation. As just described, the controller 40 functions as a gas state fluctuation change determination unit.

When it is determined in S105 that no storage tank switch has been made, the controller 40 determines that there is no gas state fluctuation in which the system-side hydrogen pressure temporarily suddenly changes and performs a process of S106.

In S106, the controller 40 reads the current system-side hydrogen pressure Ps detected by the system-side pressure sensor 35 of the dispenser 30 and reads the current hydrogen temperature Tc in the fuel tank 210 detected by the vehicle-side temperature sensor 212 of the vehicle 200.

Thereafter, in S107, the controller 40 calculates a current filling rate SOCs of the hydrogen gas in the fuel tank 210 on the basis of the system-side hydrogen pressure Ps and the vehicle-side hydrogen temperature Tc read in S106. It should be noted that the filling rate is calculated on the basis of Equation (1) below.

[Equation 1]

$$SOC = \frac{d(P, T)}{d(70 \text{ MPa}, 15° \text{ C.})} \quad (1)$$

In Equation (1), a numerator $d(P, T)$ represents a gas density when the hydrogen pressure is P and the hydrogen temperature is T. A denominator $d$ (70 MPa, 15° C.) is a predetermined value and represents a gas density when the hydrogen pressure is 70 MPa and the hydrogen temperature is 15° C.

In S108, the controller 40 determines whether or not the system-side hydrogen pressure Ps read in S106 is lower than the filling stop pressure P1 and the hydrogen filling rate SOCs calculated in S107 is smaller than the filling stop filling rate SOC1.

When the hydrogen pressure Ps is lower than the filling stop pressure P1 and the filling rate SOCs is smaller than the filling stop filling rate SOC1, the controller 40 determines that hydrogen filling can be continued. Then, the controller 40 performs processes in and after S105 again to perform hydrogen filling while monitoring (referring to) the hydrogen pressure Ps and the filling rate SOCs.

In contrast, when the hydrogen pressure Ps is not lower than the filling stop pressure P1 or the hydrogen filling rate SOCs is not smaller than the filling stop filling rate SOC1, the controller 40 determines it impossible to continue hydrogen filling and performs a process of S109.

In S109, the controller 40 performs a hydrogen filling stop process and finishes the hydrogen filling control by controlling the first to third downstream on-off valves 16 to 18 and the flow rate regulating valve 19 to be closed.

As described in S105 to S108, the controller 40 of the hydrogen filling system 100 executes a first filling control of filling the hydrogen gas in the case of no switch of the storage tank 20 while monitoring the system-side hydrogen pressure Ps and the filling rate SOCs calculated on the basis of the hydrogen pressure Ps and the hydrogen temperature Tc.

Next, a control when the switch of the storage tank 20 is determined to have been made in the process of S105 is described.

When the storage tank switch is determined to have been made in S105, the controller 40 determines that there is the gas state fluctuation in which the system-side hydrogen pressure temporarily suddenly increases during hydrogen filling and performs a process of S110.

In S110, the controller 40 stops the reading of the system-side hydrogen pressure Ps detected by the system-side pressure sensor 35, stops the calculation of the filling rate SOCs on the basis of the hydrogen pressure Ps and the hydrogen temperature Tc and continues hydrogen filling. As just described, the controller 40 of the hydrogen filling system 100 executes a second filling control of filling the hydrogen gas without monitoring the system-side hydrogen pressure Ps and the filling rate SOCs on the system side when the storage tank 20 is switched.

In S111, the controller 40 determines whether or not a predetermined time has elapsed after the storage tank switch (after the start of the second filling control). As shown in FIG. 2, the predetermined time is a time until a hydrogen pressure fluctuation after the tank switch disappears and is a predetermined time. In the present embodiment, the predetermined time is set, for example, at a time of about several to several tens of seconds. It should be noted that since a period affected by the hydrogen pressure fluctuation becomes shorter as the system-side hydrogen pressure Ps at the time of the tank switch increases, the predetermined time used in S111 may be set to be shorter as the hydrogen pressure Ps at the time of the tank switch is higher.

When it is determined in S111 that the predetermined time has not yet elapsed, the controller 40 performs the process of S110 again. In contrast, when it is determined in S111 that the predetermined time has elapsed, the controller 40 performs the processes in and after S106. As just described, the controller 40 switches a hydrogen filling process from the second filling control of performing hydrogen filling without using the hydrogen pressure Ps and SOCs on the system side to the first filling control of performing hydrogen filling while monitoring the hydrogen pressure Ps and SOCs when the predetermined time elapses after the storage tank switch. The controller 40 functions as a filling control unit for executing the first and second filling controls.

According to the hydrogen filling system 100 of the present embodiment described above, the following effects can be obtained.

The hydrogen filling system 100 includes the controller 40, and the controller 40 executes the first filling control of filling hydrogen into the vehicle 200 from the dispenser 30 on the basis of the system-side hydrogen pressure Ps detected by the system-side pressure sensor 35. Further, the controller 40 determines whether or not there is the gas state fluctuation in which the system-side hydrogen pressure temporarily suddenly changes during hydrogen filling and executes the second filling control of filling hydrogen into the vehicle 200 from the dispenser 30 without using the system-side hydrogen pressure Ps if there is the gas state fluctuation. It should be noted that, when the storage tank is switched, the controller 40 determines that there is the gas state fluctuation in which the system-side hydrogen pressure temporarily suddenly changes.

Accordingly, when the storage tank 20 connected to the dispenser 30 is switched from the medium-pressure storage tank 22 to the high-pressure storage tank 23 at time t5 of FIG. 2, the second filling control not using the system-side hydrogen pressure Ps is executed. Thus, even if the hydrogen pressure Ps suddenly increases and exceeds the filling stop pressure P1, hydrogen filling is not stopped. This can prevent an erroneous stop of hydrogen filling due to the storage tank switch. Therefore, in the hydrogen filling system 100, hydrogen filling is not stopped before a desired amount of the hydrogen gas is filled into the fuel tank 210 of the vehicle 200 and the hydrogen gas can be efficiently filled into the fuel tank 210.

The controller 40 of the hydrogen filling system 100 executes the second filling control, in which the system-side hydrogen pressure Ps is not monitored, after the storage tank switch. Then, the controller 40 switches from the second filling control to the first filling control of performing hydrogen filling while monitoring the hydrogen pressure Ps and the filling rate SOCs when the predetermined time elapses after the start of the second filling control. By switching the filling control when the predetermined time elapses after the storage tank switch in this way, it can be suppressed so that the second filling control, in which the system-side hydrogen pressure Ps and the like are not monitored, is continued for a long time and hydrogen gas filled into the fuel tank 210 more than the desired amount during the second filling control can be prevented.

Further, the controller 40 of the hydrogen filling system 100 continues hydrogen filling until the hydrogen pressure Ps reaches the filling stop pressure P1 or the filling rate SOCs calculated using the hydrogen pressure Ps reaches the filling stop filling rate SOC1 in the case of executing the first filling control on the basis of the system-side hydrogen pressure Ps. As just described, in the hydrogen filling system 100, hydrogen filling is performed while two parameters, i.e. the hydrogen pressure Ps and the filling rate SOCs are monitored, wherefore hydrogen filling can be more safely performed.

Second Embodiment

A hydrogen filling system 100 according to a second embodiment of the present invention is described with reference to FIG. 4. It should be noted that, in the following embodiments, components and the like fulfilling the same functions as in the first embodiment are denoted by the same reference signs and repeated description is omitted as appropriate.

Figure 4:
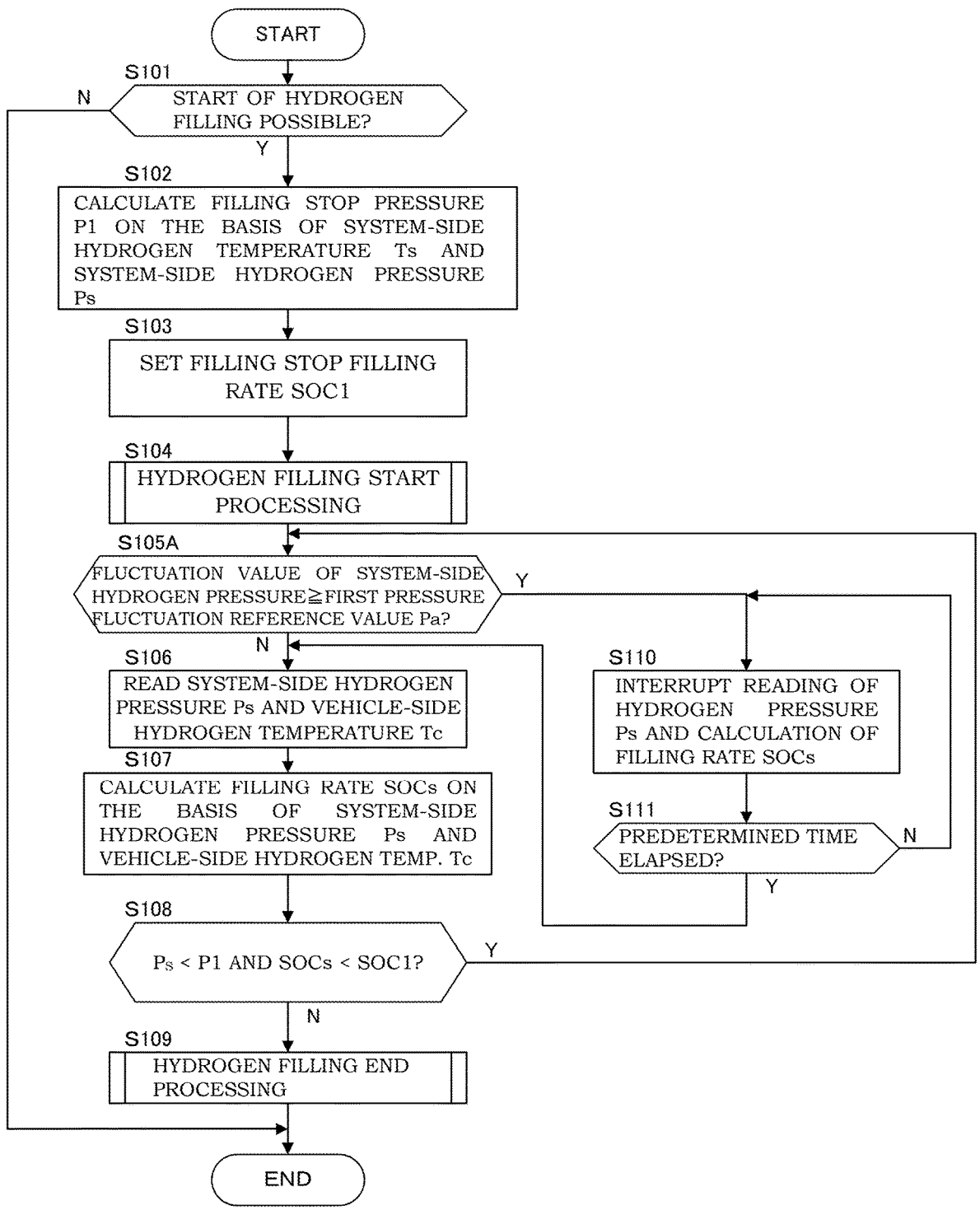
FIG. 4 is a flow chart showing a hydrogen filling control executed by a controller of a hydrogen filling system according to a second embodiment.

FIG. 4 is a flow chart showing a hydrogen filling control executed by a controller 40 of the hydrogen filling system 100 according to the second embodiment.

As shown in FIG. 4, in the hydrogen filling system 100 of the second embodiment, a gas state fluctuation determination process executed after a processing of S104 differs from that of the first embodiment. That is, the controller 40 of the hydrogen filling system 100 of the second embodiment performs a process of S105A after the processing of S104.

In S105A, the controller 40 determines whether or not a fluctuation value of a system-side hydrogen pressure is not smaller than a first pressure fluctuation reference value Pa. The first pressure fluctuation reference value Pa is set in advance as a value capable of detecting a sudden increase of the system-side hydrogen pressure such as after a storage tank switch. As just described, S105A is the gas state fluctuation determination process for determining whether or not there is a hydrogen pressure fluctuation (see broken-line regions R1 to R3 of FIG. 2) in which a pressure of hydrogen gas supplied from a dispenser 30 temporarily suddenly changes.

The fluctuation value of the system-side hydrogen pressure is calculated on the basis of a hydrogen pressure Ps detected by a system-side pressure sensor 35. For example, the controller 40 reads the hydrogen pressures Ps periodically detected and calculates an absolute value of a deviation between the hydrogen pressures Ps at two points detected at a unit time interval as the fluctuation value of the system-side hydrogen pressure. It should be noted that a pressure fluctuation rate may be calculated by dividing the other hydrogen pressure Ps by one hydrogen pressure Ps out of the two hydrogen pressures Ps and this pressure fluctuation rate may be set as the fluctuation value of the system-side hydrogen pressure.

When the fluctuation value of the system-side hydrogen pressure is smaller than the first pressure fluctuation reference value Pa, the controller 40 performs processes in and after S106 and executes a first filling control of filling the hydrogen gas while monitoring the hydrogen pressure Ps and a filling rate SOCs calculated using the hydrogen pressure Ps.

In contrast, when the fluctuation value of the system-side hydrogen pressure is not smaller than the first pressure fluctuation reference value Pa, the controller 40 performs processes in and after S110. In S110, the controller 40 executes a second filling control of filling the hydrogen gas without monitoring the hydrogen pressure Ps and the filling rate SOCs.

In the hydrogen filling system 100 according to the second embodiment, the controller 40 determines that there is a temporary hydrogen pressure fluctuation (gas state fluctuation) such as due to the storage tank switch when the fluctuation value of the system-side hydrogen pressure becomes equal to or larger than the first pressure fluctuation reference value Pa during hydrogen filling and executes the second filling control.

Accordingly, the second filling control not using the system-side hydrogen pressure Ps is executed such as when the tank connected to the dispenser 30 is switched from a medium-pressure storage tank 22 to a high-pressure storage tank 23. Thus, hydrogen filling is not stopped even if the hydrogen pressure Ps temporarily suddenly increases and exceeds a filling stop pressure P1. Further, in the present embodiment, hydrogen filling is not stopped even if the system-side hydrogen pressure Ps suddenly increases due to any factor other than the storage tank switch. In this way, in the hydrogen filling system 100, hydrogen filling is not stopped before a desired amount of the hydrogen gas is filled into a fuel tank 210 of a vehicle 200 and the hydrogen gas can be efficiently filled into the fuel tank 210.

Third Embodiment

Figure 5:
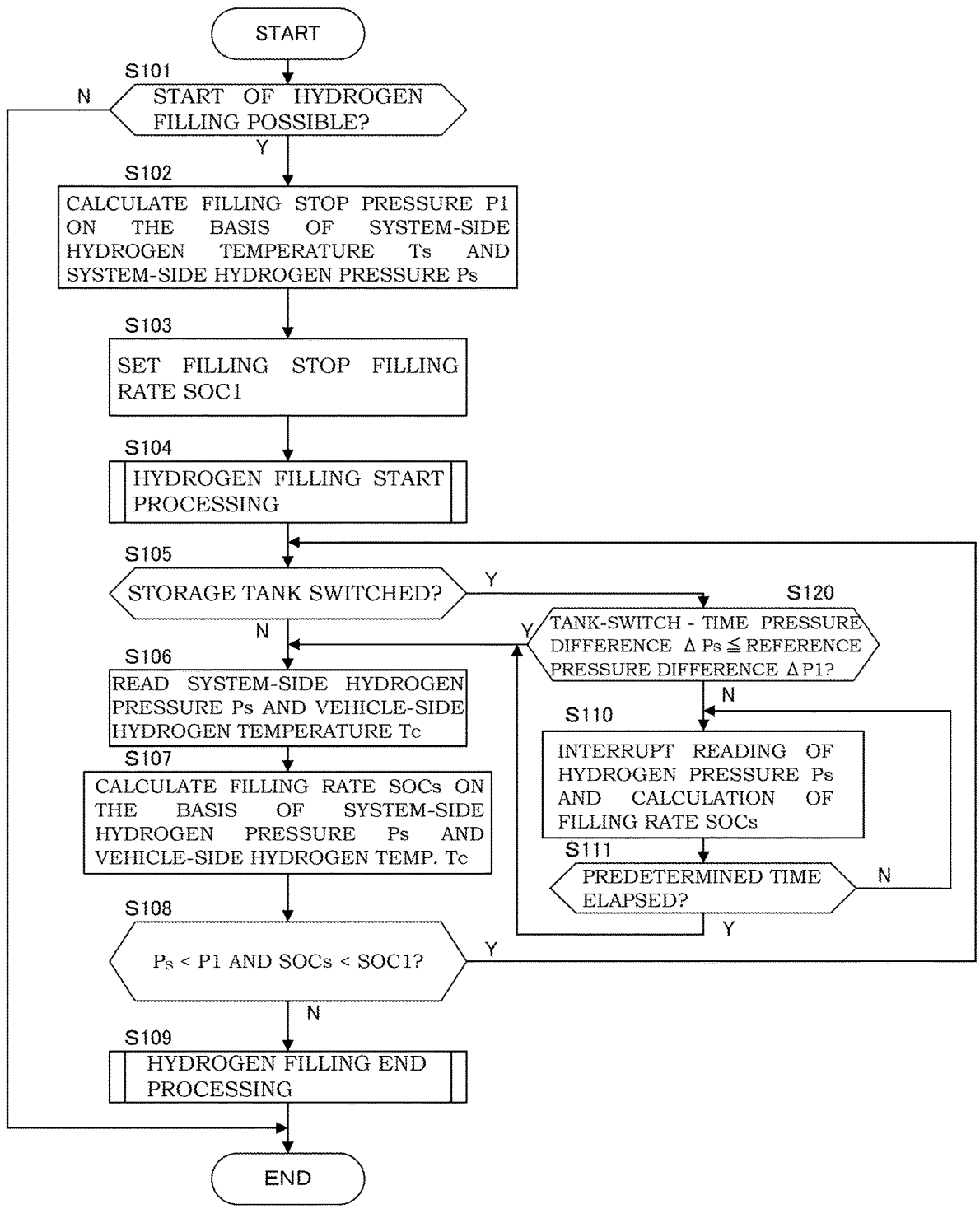
FIG. 5 is a flow chart showing a hydrogen filling control executed by a controller of a hydrogen filling system according to a third embodiment.

A hydrogen filling system 100 according to a third embodiment of the present invention is described with reference to FIG. 5. FIG. 5 is a flow chart showing a hydrogen filling control executed by a controller 40 of the hydrogen filling system 100 according to the third embodiment.

As shown in FIG. 5, the hydrogen filling system 100 of the third embodiment differs from the hydrogen filling system of the first embodiment in performing a process of S120 before a processing of S110.

The controller 40 of the hydrogen filling system 100 of the third embodiment performs the process of S120 when a storage tank switch is determined in S105.

In S120, the controller 40 determines whether or not a tank-switch time pressure difference ΔPs is not larger than a reference pressure difference ΔP1.

The controller 40 calculates a value obtained by subtracting a hydrogen pressure Ps detected by a system-side pressure sensor 35 at the time of the storage tank switch from a filling stop pressure P1 as the tank-switch time pressure difference ΔPs. For example, in the case of a switch from a medium-pressure storage tank 22 to a high-pressure storage tank 23 as shown in FIG. 2, the tank-switch time pressure difference ΔPs is calculated on the basis of the system-side hydrogen pressure Ps at time t5, which is a switch timing of the high-pressure storage tank 23, and the filling stop pressure P1. It should be noted that the reference pressure difference ΔP1 is set in advance as a value for preventing a pressure of hydrogen gas in a fuel tank 210 from exceeding the filling stop pressure P1 during a second filling control executed for a predetermined time after the tank switch. As just described, the controller 40 functions as a pressure difference calculation unit for calculating the tank-switch time pressure difference.

When the tank-switch time pressure difference ΔPs is larger than the reference pressure difference ΔP1, the controller 40 performs a process of S110 and executes a second filling control of filling the hydrogen gas without monitoring the hydrogen pressure Ps and the filling rate SOCs. That is, if the tank-switch time pressure difference ΔPs is larger than the reference pressure difference ΔP1, the controller 40 determines that the hydrogen pressure in the fuel tank 210 will not reach the filling stop pressure during the second filling control and performs processes in and after S110.

In contract, when the tank-switch time pressure difference ΔPs is not larger than the reference pressure difference ΔP1, the controller 40 executes a first filling control of filling the hydrogen gas while monitoring the hydrogen pressure Ps and the filling rate SOCs on the basis of the processes in and after S106. That is, if the tank-switch time pressure difference ΔPs is not larger than the reference pressure difference ΔP1, the controller 40 determines a possibility that the hydrogen pressure in the fuel tank 210 reaches the filling stop pressure during the second filling control and executes the first filling control instead of the second filling control even at the time of the storage tank switch.

In the hydrogen filling system 100 according to the third embodiment, the controller 40 executes the first filling control of filling the hydrogen gas while monitoring the hydrogen pressure Ps and the like instead of the second filling control even at the time of the storage tank switch if the tank-switch time pressure difference ΔPs is not larger than the reference pressure difference ΔP1.

If the second filling control after the storage tank switch is executed when the hydrogen pressure of the fuel tank 210 of the vehicle 200 has increased to a level near the filling stop pressure P1, hydrogen filling is performed without monitoring the hydrogen pressure and the like. Thus, the hydrogen gas may be supplied even if the hydrogen pressure in the fuel tank 210 exceeds the filling stop pressure P1. However, in the hydrogen filling system 100, since the first filling control is executed instead of the second filling control if the hydrogen pressure of the fuel tank 210 of the vehicle 200 has increased up to a level near the filling stop pressure P1 (in the case of Y in S120), it can be reliably avoided that the hydrogen gas is filled in a state where the hydrogen pressure in the fuel tank 210 is higher than the filling stop pressure P1. Therefore, according to the hydrogen filling system 100, it is possible to safely fill the hydrogen gas into the vehicle 200.

Fourth Embodiment

Figure 6:
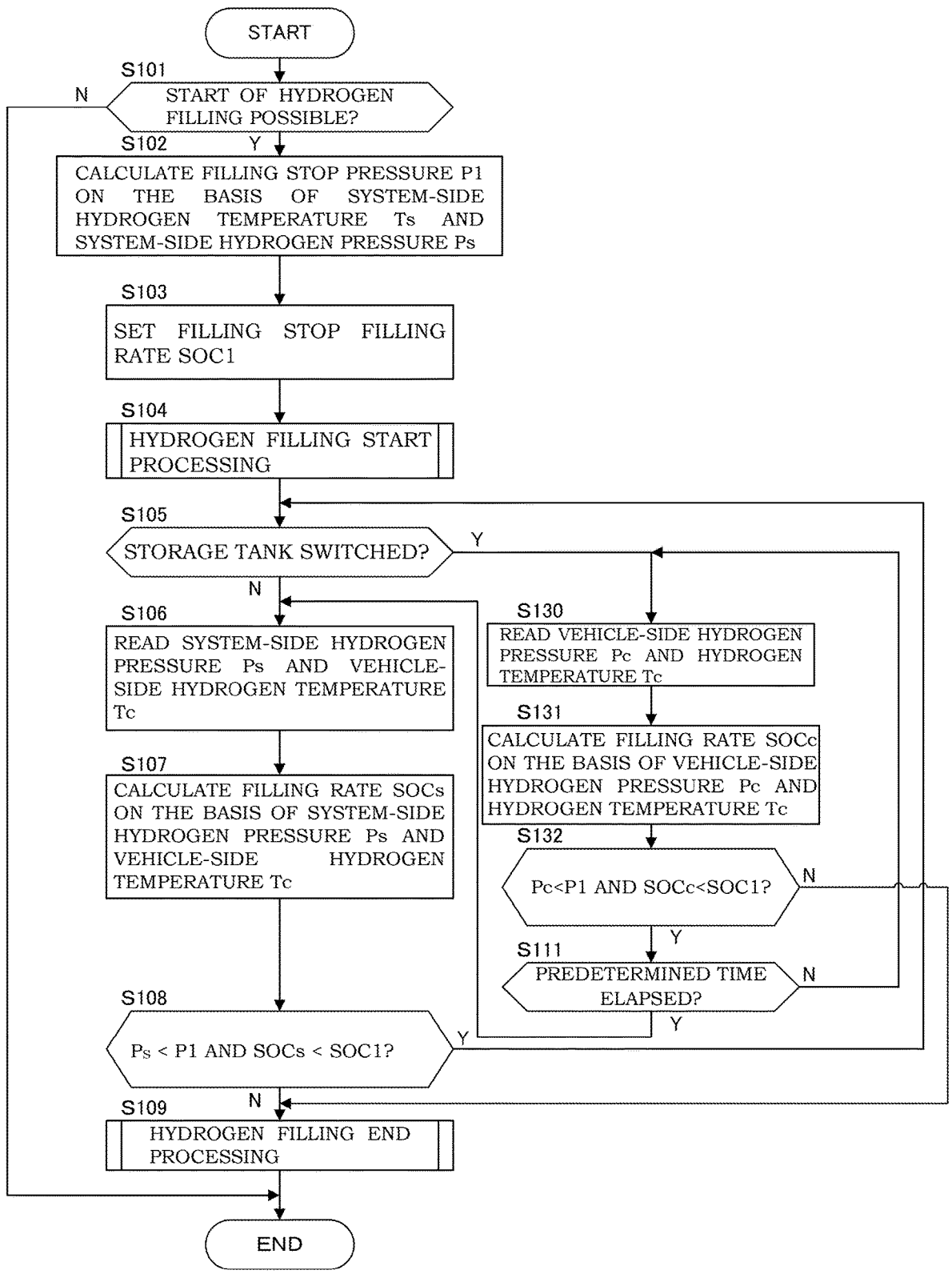
FIG. 6 is a flow chart showing a hydrogen filling control executed by a controller of a hydrogen filling system according to a fourth embodiment.

A hydrogen filling system 100 according to a fourth embodiment of the present invention is described with reference to FIG. 6. FIG. 6 is a flow chart showing a hydrogen filling control executed by a controller 40 of the hydrogen filling system 100 according to the fourth embodiment.

As shown in FIG. 6, the hydrogen filling system 100 of the fourth embodiment differs from the hydrogen filling system of the first embodiment in performing processes of S130 to S132 after a storage tank switch.

The controller 40 of the hydrogen filling system 100 of the fourth embodiment performs the process of S130 when the storage tank switch is determined in S105.

In S130, the controller 40 reads the hydrogen pressure Pc and the hydrogen temperature Tc on a vehicle side included in vehicle-side information received by the receiver 34 of the dispenser 30. The hydrogen pressure Pc is a pressure of hydrogen gas in a fuel tank 210 detected by a vehicle-side pressure sensor 211 of a vehicle 200.

In S131, the controller 40 calculates a current filling rate SOCc of the hydrogen gas in the fuel tank 210 on the basis of the hydrogen pressure Pc and the hydrogen temperature Tc read in S130. The filling rate SOCc is calculated on the basis of Equation (1) described above.

In S132, the controller 40 determines whether or not the vehicle-side hydrogen pressure Pc read in S130 is lower than a filling stop pressure P1 and the filling rate SOCc calculated in S131 is smaller than a filling stop filling rate SOC1.

When the vehicle-side hydrogen pressure Pc is lower than the filling stop pressure P1 and the filling rate SOCc is smaller than the filling stop filling rate SOC1, the controller 40 continues hydrogen filling (second filling control) while monitoring the hydrogen pressure Pc and the filling rate SOCc and performs a process of S111.

In contrast, the controller 40 performs a process of S109 and finishes the hydrogen filling control when the hydrogen pressure Pc is not lower than the filling stop pressure P1 or the filling rate SOCc is not smaller than the filling stop filling rate SOC1.

In the hydrogen filling system 100 according to the fourth embodiment, the controller 40 executes a second filling control of filling the hydrogen gas while monitoring the vehicle-side hydrogen pressure Pc and the filling rate SOCc calculated using this hydrogen pressure Pc without monitoring a system-side hydrogen pressure Ps and the like after the storage tank switch. That is, the controller 40 executes the second filling control while monitoring gas-state-fluctuation time filling control parameters instead of normal time filling control parameters in the event of a gas state fluctuation.

According to this hydrogen filling system 100, whether or not a desired amount of the hydrogen gas has been filled is confirmed using only vehicle-side hydrogen pressure information instead of system-side hydrogen pressure information during the second filling control executed until a predetermined time elapses after the storage tank switch. Thus, hydrogen filling can be finished also by the second filling control when the desired amount of the hydrogen gas is filled. As a result, the hydrogen gas can be more efficiently filled into the fuel tank 210 of the vehicle 200.

Fifth Embodiment

Figure 7:
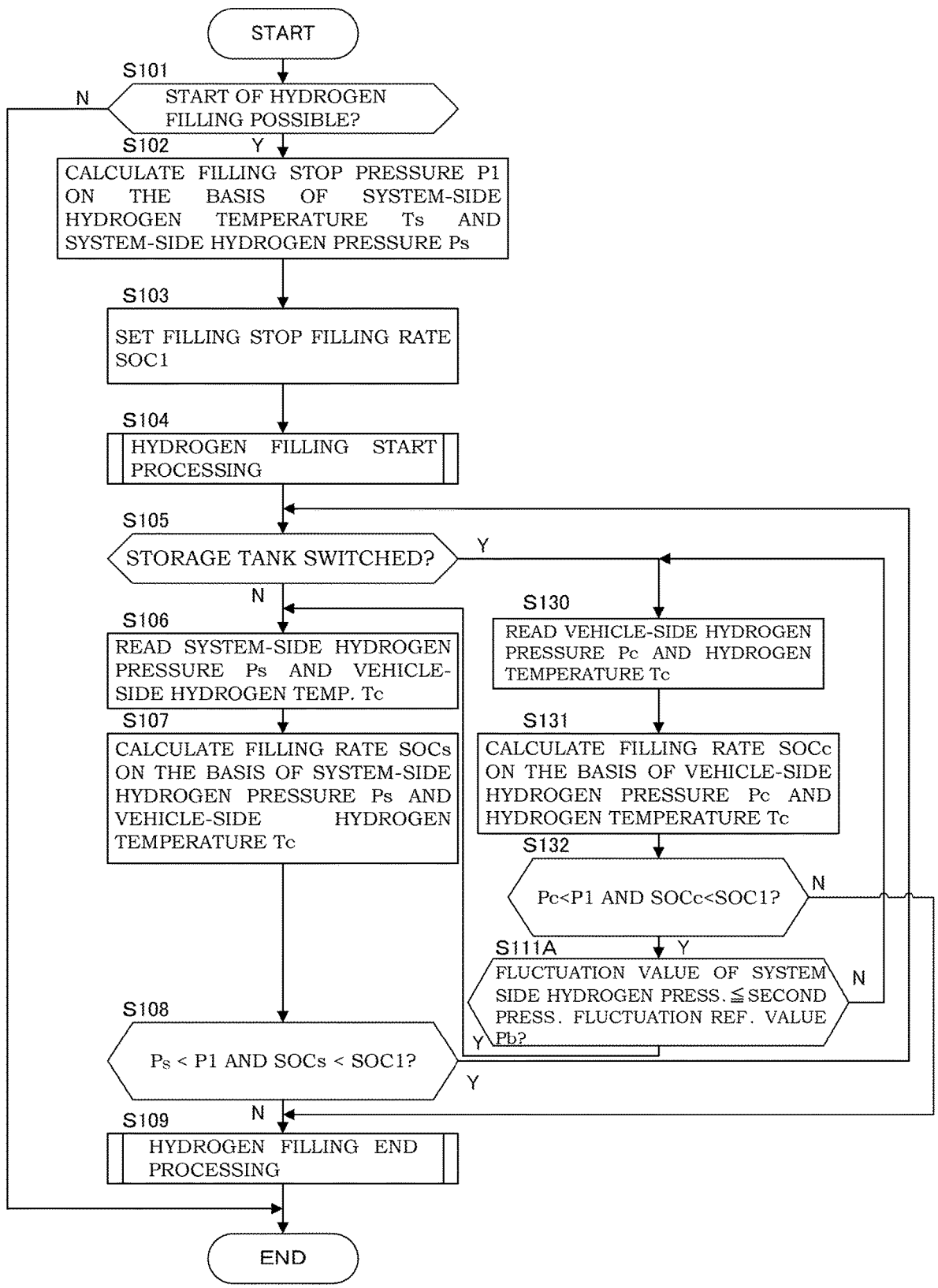
FIG. 7 is a flow chart showing a hydrogen filling control executed by a controller of a hydrogen filling system according to a fifth embodiment.

A hydrogen filling system 100 according to a fifth embodiment of the present invention is described with reference to FIG. 7. FIG. 7 is a flow chart showing a hydrogen filling control executed by a controller 40 of the hydrogen filling system 100 according to the fifth embodiment.

A switch timing determination (S111A of FIG. 7) of a second filling control in the hydrogen filling system 100 of the fifth embodiment differs from the determination (S111 of FIG. 6) in the hydrogen filling system of the fourth embodiment. The controller 40 of the hydrogen filling system 100 performs hydrogen filling while monitoring vehicle-side hydrogen pressure information after a storage tank switch (S130 to S132). Then, the controller 40 performs a process of S111A after a processing of S132.

S111A is a process relating to the determination of the switch timing of the second filling control. In S111A, the controller 40 determines whether or not a fluctuation value of a system-side hydrogen pressure is not larger than a second pressure fluctuation reference value Pb. The second pressure fluctuation reference value Pb is a value capable of detecting that the system-side hydrogen pressure is not largely fluctuating, and is set in advance as a value smaller than the first pressure fluctuation reference value Pa used in S105A of FIG. 4.

The fluctuation value of the system-side hydrogen pressure is calculated on the basis of a hydrogen pressure Ps detected by a system-side pressure sensor 35. For example, the controller 40 reads the hydrogen pressures Ps periodically detected and sets an absolute value of a deviation between the hydrogen pressures Ps at two points detected at a unit time interval as the fluctuation value of the system-side hydrogen pressure. It should be noted that a pressure fluctuation rate may be calculated by dividing the other hydrogen pressure Ps by one hydrogen pressure Ps out of the two hydrogen pressures Ps and this pressure fluctuation rate may be set as the fluctuation value of the system-side hydrogen pressure.

When the fluctuation value of the system-side hydrogen pressure is larger than the second pressure fluctuation reference value Pb, the controller 40 determines that the fluctuation of the system-side hydrogen pressure Ps has not been stabilized yet and performs the process of S130 again to continue the second filling control.

In contrast, when the fluctuation value of the system-side hydrogen pressure is not larger than the second pressure fluctuation reference value Pb, the controller 40 determines that the fluctuation of the system-side hydrogen pressure Ps has been stabilized and performs processes in and after S106 to switch the filling control from the second filling control to a first filling control.

In the hydrogen filling system 100 according to the fifth embodiment, the controller 40 switches a hydrogen filling process from the second filling control to the first filling control if the fluctuation value of the system-side hydrogen pressure is not larger than the second pressure fluctuation reference value Pb after the storage tank switch is made and the second filling control is started. In the fifth embodiment, the fluctuation value calculated on the basis of the system-side hydrogen pressure Ps is used not to finish the filling control itself, but to switch from the second filling control to the first filling control.

A filling control process can be returned from the second filling control to the first filling control at a proper timing at which the influence of the hydrogen pressure fluctuation (gas state fluctuation) is reduced by determining the switch timing of the filling control not on the basis of the elapse of time, but on the basis of the fluctuation value of the system-side hydrogen pressure as just described. In this way, in the hydrogen filling system 100, a control sequence of hydrogen filling can be quickly returned to the first filling control as a normal control.

Sixth Embodiment

Figure 8:
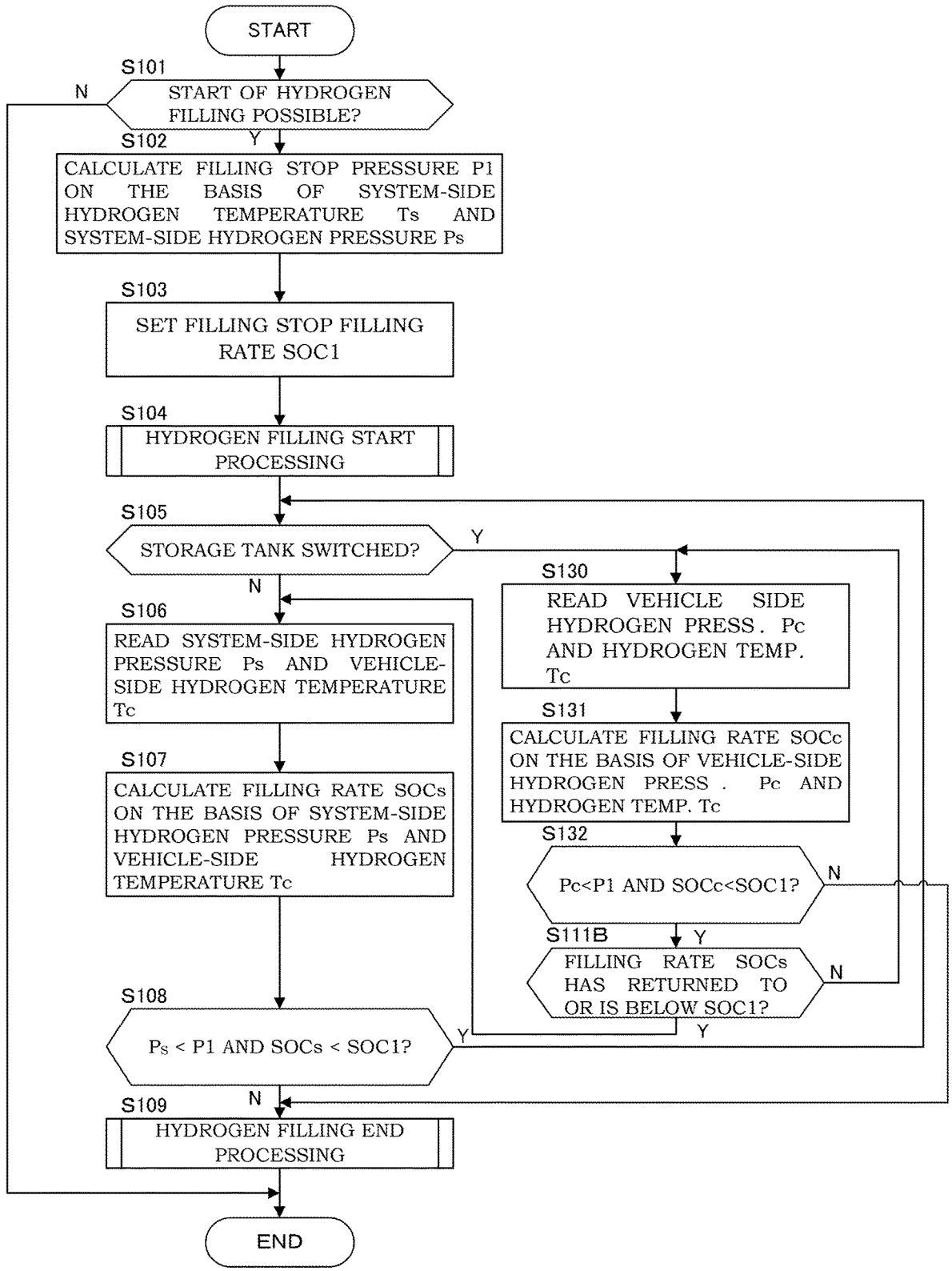
FIG. 8 is a flow chart showing a hydrogen filling control executed by a controller of a hydrogen filling system according to a sixth embodiment, FIG. 9 are graphs showing a gas state fluctuation during the execution of a leak determination control in the hydrogen filling system.

A hydrogen filling system 100 according to a sixth embodiment of the present invention is described with reference to FIG. 8. FIG. 8 is a flow chart showing a hydrogen filling control executed by a controller 40 of the hydrogen filling system 100 according to the sixth embodiment.

A switch timing determination (S111B of FIG. 8) of a second filling control in the hydrogen filling system 100 of the sixth embodiment differs from the determination (S111 of FIG. 6) in the hydrogen filling system of the fourth embodiment. The controller 40 of the hydrogen filling system 100 executes the second filling control after a storage tank switch and performs hydrogen filling according to vehicle-side hydrogen pressure information (S130 to S132). Then, the controller 40 performs a process of S111B after a processing of S132.

S111B is a process relating to the determination of the switch timing of the second filling control. In S111B, the controller 40 determines whether or not a filling rate SOCs calculated using a system-side hydrogen pressure Ps has returned to or is below a filling stop filling rate SOC1 after the storage tank switch. That is, the controller 40 determines that the calculated filling rate SOCs has returned to or is below the filling stop filling rate SOC1 when the filling rate SOCs temporarily exceeds the filling stop filling rate SOC1 after the storage tank switch and is, thereafter, reduced to or below the filling stop filling rate SOC1.

If the filling rate SOCs is a sufficiently small value even when the hydrogen pressure Ps increases, the filling rate SOCs does not, in fact, exceed the filling stop filling rate SOC1. Thus, also if the filling rate SOCs is a sufficiently small value, the controller 40 determines that the filling rate SOCs has returned to or is below the filling stop filling rate SOC1.

Unless the filling rate SOCs has returned to or is below the filling stop filling rate SOC1, the controller 40 determines that the fluctuation of the system-side hydrogen pressure Ps has not been stabilized yet and performs a process of S130 again to continue the second filling control.

In contrast, when the filling rate SOCs has returned to or is below the filling stop filling rate SOC1, the controller 40 determines that the fluctuation of the system-side hydrogen pressure Ps has been stabilized and performs processes in and after S106 to switch the filling control from the second filling control to a first filling control. In the sixth embodiment, the filling rate SOCs calculated on the basis of the hydrogen pressure Ps and a hydrogen temperature Tc is used not to finish the filling control itself, but to switch from the second filling control to the first filling control.

In the hydrogen filling system 100 according to the sixth embodiment, the controller 40 switches a hydrogen filling process from the second filling control to the first filling control when the filling rate SOCs calculated on the basis of the hydrogen pressure Ps and the hydrogen temperature Tc has returned to or is below the filling stop filling rate SOC1 after the storage tank switch is made and the second filling control is started.

A filling control process can be returned from the second filling control to the first filling control at a proper timing at which the influence of the hydrogen pressure fluctuation is reduced by determining the switch timing of the filling control not on the basis of the elapse of time, but on the basis of the filling rate SOCs calculated from the hydrogen pressure Ps as just described. In this way, in the hydrogen filling system 100, a control sequence of hydrogen filling can be quickly returned to the first filling control as a normal control.

Seventh Embodiment

Figure 9:
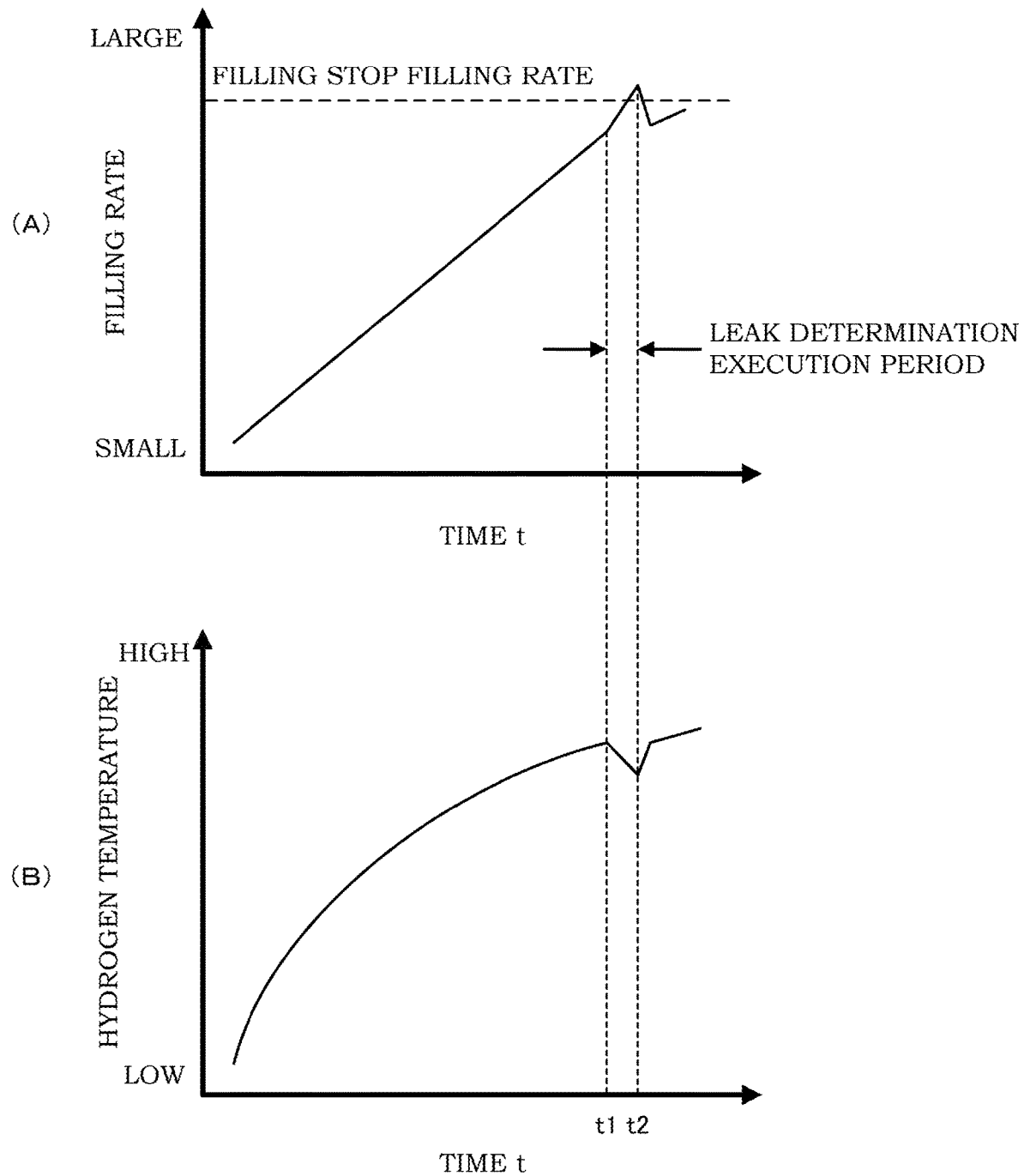
Figure 10:
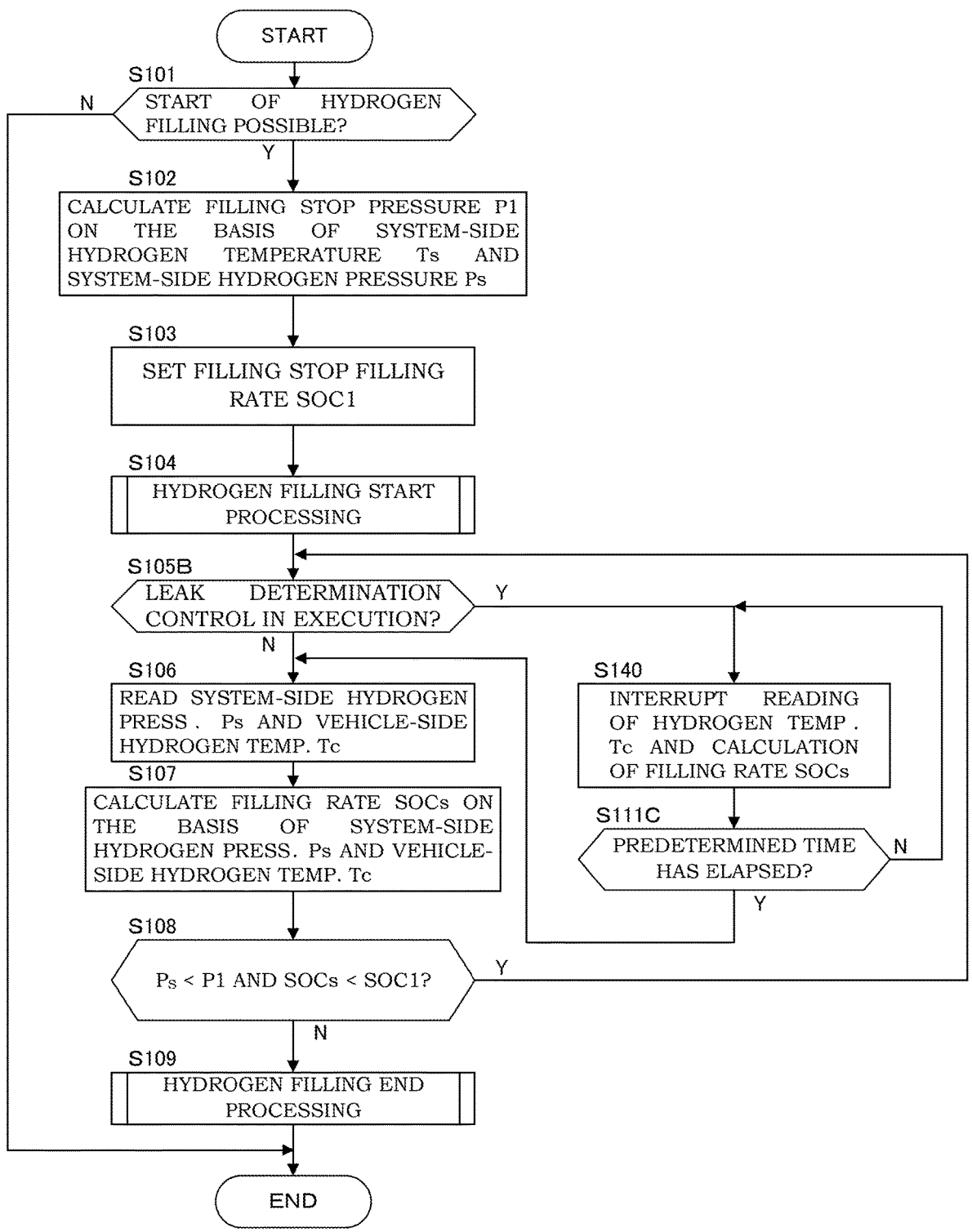
FIG. 10 is a flow chart showing a hydrogen filling control executed by a controller of a hydrogen filling system according to a seventh embodiment.

A hydrogen filling system 100 according to a seventh embodiment of the present invention is described with reference to FIGS. 9 and 10. FIG. 9 shows graphs showing a gas state fluctuation during the execution of a leak determination control in the hydrogen filling system 100. FIG. 10 is a flow chart showing a hydrogen filling control executed by a controller 40 of the hydrogen filling system 100 according to the seventh embodiment.

The hydrogen filling system 100 is configured to execute the leak determination control during hydrogen filling. During the execution of the leak determination control, the controller 40 closes on-off valves provided in a dispenser 30 to form a gas supply path from the dispenser 30 to a fuel tank 210 into a closed circuit. Then, the controller 40 determines the presence or absence of hydrogen gas leakage on the basis of whether or not a hydrogen pressure in the closed circuit has been reduced. In this way, the controller 40 functions as a leak determination execution unit for executing the leak determination control.

The leak determination control is a control executed for a predetermined time (e.g. 10 sec) and executed several times during hydrogen filling. It should be noted that the on-off valves of the dispenser 30 are basically open in normal time in which the leak determination control is not executed.

The inventors of the present application obtained knowledge that a hydrogen temperature (gas state) in the fuel tank 210 of a vehicle 200 decreased and a filling rate calculated on the basis of the hydrogen temperature increased during the execution of the aforementioned leak determination control. If the hydrogen temperature decreases and the filling rate increases in this way, hydrogen filling may be finished (erroneous stop) although a desired amount of hydrogen gas has not been filled into the fuel tank. Accordingly, the hydrogen filling system 100 dealing with a gas state fluctuation due to a hydrogen temperature reduction is described below.

First, the hydrogen temperature and filling rate fluctuations during the execution of the leak determination control are described in detail with reference to FIG. 9. FIG. 9(A) is a graph showing a hydrogen temperature change in the fuel tank 210 during hydrogen filling and FIG. 9(B) is a graph showing a filling rate change in the fuel tank 210 during hydrogen filling calculated on the basis of Equation (1).

When hydrogen gas is filled into the fuel tank 210 of the vehicle 200, the temperature of the hydrogen gas in the fuel tank 210 increases as hydrogen filling proceeds as shown in FIG. 9(B) and, together with this, the filling rate of the hydrogen gas also increases as shown in FIG. 9(A). The leak determination control is started at a predetermined timing during hydrogen filling and hydrogen filling is resumed after the end of the leak determination control. It is assumed that the leak determination control is executed, for example, for a period from time t1 to time t2 (period of about 10 sec) in FIGS. 9(A) and 9(B).

When the leak determination control is executed, the supply of the hydrogen gas to the fuel tank 210 is stopped, whereby the hydrogen temperature in the fuel tank 210 decreases. This temperature decrease is due to the natural diffusion of the hydrogen gas in the fuel tank 210 and the uniformity of a hydrogen gas distribution in the fuel tank 210 caused by the stop of the supply of the hydrogen gas. In this way, a gas state fluctuation in which the hydrogen temperature in the fuel tank 210 relatively quickly decreases occurs during the execution of the leak determination control.

If the hydrogen temperature in the fuel tank 210 decreases, the hydrogen filling rate calculated on the basis of this hydrogen temperature increases.

As shown in Equation (1), a current gas density d(P, T) in the fuel tank 210 is necessary to calculate the filling rate. Here, the gas density d(P, T) is expressed by Equation (2) on the basis of a gas state equation.

[Equation 2]

$$d \propto \frac{P}{zRT} \quad (2)$$

z: compression coefficient
R: gas constant.

As in Equation (2), the gas density d(P, T) is a value proportional to P/zRT. Thus, if the hydrogen temperature decreases during the execution of the leak determination control, the gas density d(P, T) increases. As a result, the filling rate increases during the execution of the leak determination control as shown in FIG. 9(A). If the leak determination control is executed with the fuel tank 210 of the vehicle 200 filled with the hydrogen gas to a certain extent, the filling rate during the aforementioned leak determination may reach a filling stop filling rate as it increases. In this case, hydrogen filling by the hydrogen filling system 100 is finished (erroneous stop) although hydrogen filling cannot be resumed after the leak determination and a planned amount of the hydrogen gas has not been filled into the fuel tank 210 of the vehicle 200.

Accordingly, in the hydrogen filling system 100 according to the present embodiment, the hydrogen filling control shown in FIG. 10 is executed in consideration of a sudden decrease of the hydrogen temperature (gas state) in the fuel tank 210 during the leak determination control and the like, in order to prevent the occurrence of an erroneous stop of hydrogen filling as described above.

As shown in FIG. 10, the hydrogen filling system 100 of the seventh embodiment differs from the system of the first embodiment in a gas state fluctuation determination process (S105B) and processes in the presence of a gas state fluctuation (S140, S111C).

The controller 40 of the hydrogen filling system 100 according to the seventh embodiment performs a process of S105B after performing a hydrogen filling start process of S104.

In S105B, the controller 40 determines whether or not the leak determination control is in execution. For example, the controller 40 determines that the leak determination control is in execution when the on-off valves provided in the dispenser 30 are closed. As just described, S105B is the gas state fluctuation determination process for determining whether or not there is a gas state fluctuation in which the temperature of the hydrogen gas in the fuel tank 210 of the vehicle 200 decreases. The controller 40 functions as a gas state fluctuation determination unit.

When it is determined in S105B that the leak determination control is not in execution, the controller 40 successively performs processes in and after S106. The controller 40 executes a first filling control of filling the hydrogen gas while monitoring the system-side hydrogen pressure Ps and a filling rate SOCs calculated on the basis of the hydrogen pressure Ps and a hydrogen temperature Tc after the end of the leak determination control.

Next, a control when it is determined in the process of S105B that the leak determination control is in execution is described.

When it is determined in S105B that the leak determination control is in execution, the controller 40 determines that there is the gas stage fluctuation in which the hydrogen temperature in the fuel tank 210 of the vehicle 200 decreases and performs a process of S140.

In S140, the controller 40 stops the reading of the vehicle-side hydrogen temperature Tc detected by a vehicle-side temperature sensor 212 and stops the calculation of the filling rate SOCs on the basis of the hydrogen temperature Tc and the hydrogen pressure Ps. Then, the controller 40 resumes hydrogen filling after the end of the leak determination control. As just described, the controller 40 executes a second filling control of filling the hydrogen gas without monitoring the vehicle-side hydrogen temperature Tc and the filling rate SOCs after the execution of the leak determination control.

In S111C after the processing of S140, the controller 40 determines whether or not a predetermined time has elapsed after the detection of the gas state fluctuation (after the execution of the leak determination control). The predetermined time is a time set to be longer than a time required for the leak determination control and is a predetermined time (several tens of sec).

When it is determined in S111C that the predetermined time has not elapsed yet, the controller 40 performs the process of S140 again. In contrast, when it is determined in S111C that the predetermined time has elapsed, the controller 40 performs processes in and after S106.

As just described, the controller 40 switches a hydrogen filling process from the second filling control of performing hydrogen filling without using the vehicle-side hydrogen temperature Tc and the filling rate SOCs to the first filling control of performing hydrogen filling while monitoring the hydrogen pressure Ps, the hydrogen temperature Tc and SOCs when the predetermined time elapses after the execution of the leak determination control.

According to the hydrogen filling system 100 of the present embodiment described above, the following effects can be obtained.

The hydrogen filling system 100 includes the controller 40, and the controller 40 executes the first filling control of filling hydrogen into the vehicle 200 from the dispenser 30 using the filling rate calculated using the hydrogen temperature Tc detected by the vehicle-side temperature sensor 212. Further, the controller 40 determines whether or not there is a gas state fluctuation in which the hydrogen temperature in the fuel tank 210 suddenly changes during hydrogen filling and executes the second filling control of filling hydrogen into the vehicle-side 200 from the dispenser 30 using the vehicle-side hydrogen temperature Tc when there is the gas state fluctuation. It should be noted that the controller 40 determines that there is the gas state fluctuation in which the hydrogen temperature temporarily decreases when the leak determination control is in execution.

Accordingly, such as during the execution of the leak determination control in which the gas state fluctuation occurs, the second filling control is executed without using the vehicle-side hydrogen temperature Tc, more specifically without monitoring the filling rate SOCs calculated using the hydrogen temperature Tc. Thus, even if the hydrogen temperature Tc decreases and the filling rate SOCs exceeds the filling stop filling rate, the hydrogen filling control is not stopped. In this way, even if the leak determination control in which the hydrogen temperature decreases is executed, the second filling control is executed, wherefore an erroneous stop of hydrogen filling can be prevented. Therefore, in the hydrogen filling system 100, hydrogen filling is not finished before a desired amount of the hydrogen gas is filled into the fuel tank 210 and the hydrogen gas can be efficiently filled into the fuel tank 210.

Further, the controller 40 switches from the second filling control to the first filling control to perform hydrogen filling while monitoring the hydrogen pressure Ps and the filling rate SOCs when the predetermined time elapses after the execution of the leak determination control (after the detection of the gas state fluctuation). By switching the filling process in this way, the second filling control in which the vehicle-side hydrogen temperature Tc and the like are not monitored is not continued for a long time, wherefore it can be prevented that the hydrogen gas is filled into the fuel tank 210 more than desired during the second filling control.

Furthermore, the controller 40 continues hydrogen filling until the hydrogen pressure Ps reaches the filling stop pressure P1 or the filling rate SOCs calculated on the basis of the hydrogen pressure Ps and the hydrogen temperature Tc reaches the filling stop filling rate SOC1 in the case of executing the first filling control. As just described, in the hydrogen filling system 100, hydrogen filling is performed while two parameters, i.e. the hydrogen pressure Ps and the filling rate SOCs are monitored, wherefore hydrogen filling can be more safely performed.

Eighth Embodiment

Figure 11:
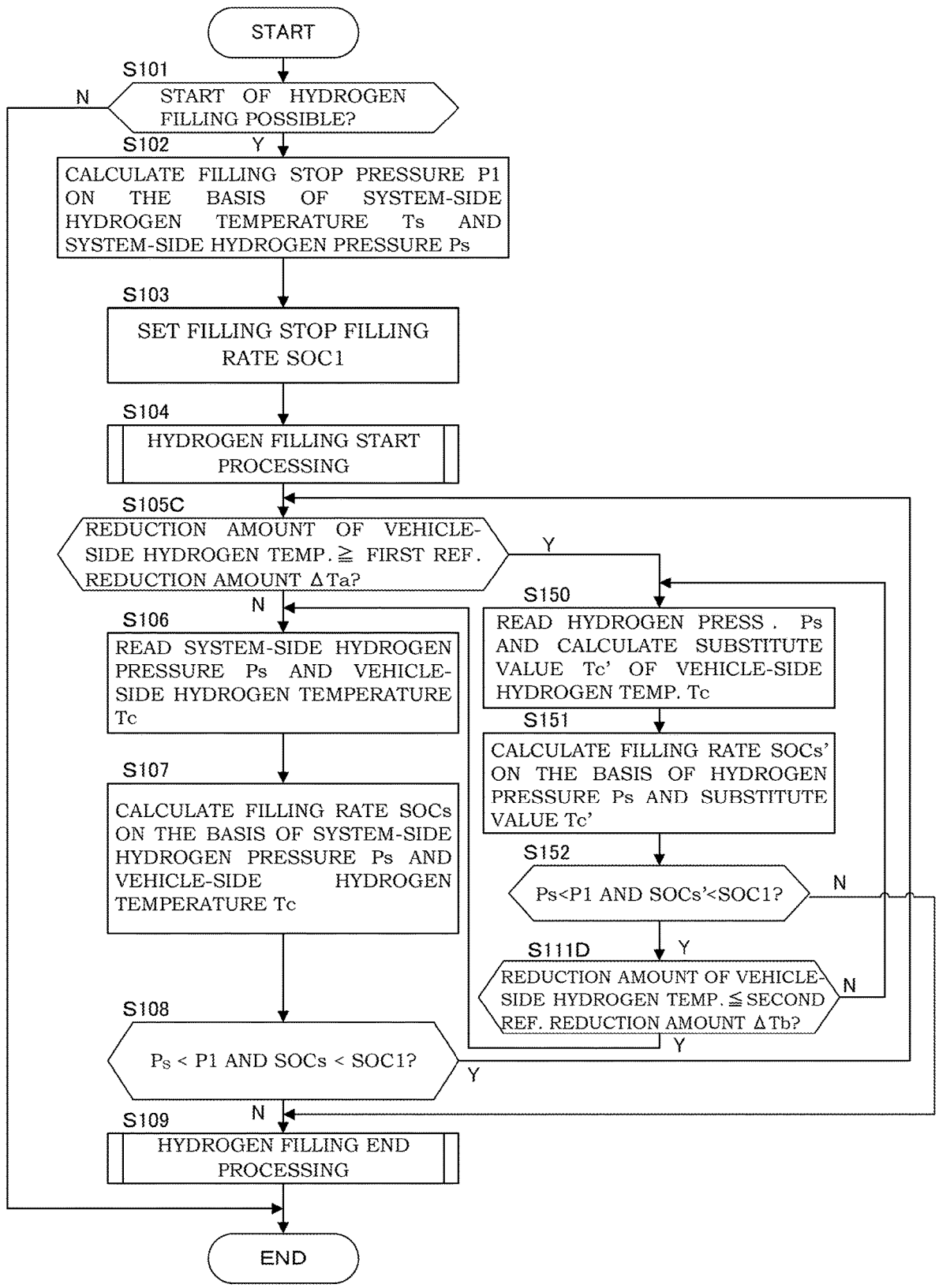
FIG. 11 is a flow chart showing a hydrogen filling control executed by a controller of a hydrogen filling system according to an eighth embodiment.

A hydrogen filling system 100 according to an eighth embodiment of the present invention is described with reference to FIG. 11. FIG. 11 is a flow chart showing a hydrogen filling control executed by a controller 40 of the hydrogen filling system 100 according to the eighth embodiment.

As shown in FIG. 11, the hydrogen filling system 100 of the eighth embodiment differs from the system of the seventh embodiment in a gas state fluctuation determination process (S105C) and processes when there is a gas state fluctuation (S150 to 152, S111D).

In the eighth embodiment, the controller 40 of the hydrogen filling system 100 performs S105C as the gas state fluctuation determination process after the processing of S104.

In S105C, the controller 40 determines whether or not a reduction amount of a vehicle-side hydrogen temperature is not less than a first reference reduction amount ΔTa. The reduction amount of the vehicle-side hydrogen temperature is a positive value calculated on the basis of a hydrogen temperature Tc detected by a vehicle-side temperature sensor 212 and increases with a reduction of the hydrogen temperature. The first reference reduction amount ΔTa is set in advance as a value capable of detecting a sudden decrease of the hydrogen temperature in a fuel tank 210 due to a leak determination control and other factors. As just described, S105C is a gas state fluctuation determination process for determining whether or not there is a hydrogen temperature fluctuation (gas state fluctuation) in which the temperature of hydrogen gas in the fuel tank 210 decreases.

When the reduction amount of the hydrogen temperature is smaller than the first reference reduction amount ΔTa, the controller 40 determines that there is no gas state fluctuation and performs processes in and after S106. In S106 to S108, the controller 40 executes a first filling control of filling the hydrogen gas while monitoring a hydrogen pressure Ps and a filling rate SOCs calculated on the basis of the hydrogen pressure Ps and the hydrogen temperature Tc.

In contrast, when the reduction amount of the hydrogen temperature is not smaller than the first reference reduction amount ΔTa, the controller 40 performs a process of S150.

In S150, the controller 40 reads the hydrogen pressure Ps detected by a system-side pressure sensor 35 and calculates a substitute value Tc' used instead of the vehicle-side hydrogen temperature Tc. If it is determined in S105C that the hydrogen temperature reduction amount is not smaller than the first reference reduction amount, there is a possibility of erroneously stopping hydrogen filling if the hydrogen temperature Tc detected thereafter is used as it is. Thus, the controller 40 calculates the hydrogen temperature Tc immediately before the start of the reduction as the substitute value Tc'. It should be noted that a hydrogen temperature in the fuel tank 210 may be estimated on the basis of a current hydrogen temperature Ts detected by a system-side temperature sensor 36 and a filling time from the start of hydrogen filling to the present and that estimation value may be calculated as the substitute value Tc'. The substitute value Tc' has only to be a value set to prevent an erroneous stop of the filling control and may be a predetermined value set in advance instead of being calculated as described above.

In S151, the controller 40 calculates a filling rate SOCs' of the hydrogen gas on the basis of the hydrogen pressure Ps and the substitute value Tc' of the hydrogen temperature. The filling rate SOCs' is calculated on the basis of Equation (1) described above.

In S152, the controller 40 determines whether or not the system-side hydrogen pressure Ps read in S150 is lower than a filling stop pressure P1 and the filling rate SOCs' calculated in S151 is smaller than a filling stop filling rate SOC1.

When the hydrogen pressure Ps is not lower than a filling stop pressure P1 or the filling rate SOCs' is not smaller than a filling stop filling rate SOC1, the controller 40 performs a process of S109 and finishes the hydrogen filling control.

In contrast, when the hydrogen pressure Ps is lower than the filling stop pressure P1 and the filling rate SOCs' is smaller than the filling stop filling rate SOC1, the controller 40 continues hydrogen filling while monitoring the hydrogen pressure Ps and the filling rate SOCs' and performs a process of S111D.

S111D is a process relating to the determination of a switch timing of a second filling control. In S111D, the controller 40 determines whether or not the reduction amount of the vehicle-side hydrogen temperature is not larger than a second reference reduction amount ΔTb. The reduction amount of the vehicle-side hydrogen temperature is calculated on the basis of the hydrogen temperature Tc detected by the vehicle-side temperature sensor 212. The second reference reduction amount ΔTb is a value capable of detecting that the hydrogen temperature in the fuel tank 210 has hardly decreased and is set in advance as a value smaller than the first reference reduction amount ΔTa.

When the reduction amount of the vehicle-side hydrogen temperature is larger than the second reference reduction amount ΔTb, the controller 40 determines that the reduction amount of the hydrogen temperature Tc is still large and performs the process of S150 again to continue the second filling control.

In contrast, when the reduction amount of the vehicle-side hydrogen temperature is not larger than the second reference reduction amount ΔTb, the controller 40 determines that the hydrogen temperature has hardly decreased or has increased and performs the processes in and after S106 to switch the filling control from the second filling control to the first filling control.

In the hydrogen filling system 100 according to the eighth embodiment, the controller 40 determines that there is the gas state fluctuation when the vehicle-side hydrogen temperature Tc decreases due to a certain factor during hydrogen filling and that reduction amount becomes equal to or larger than the first reference reduction amount ΔTa. In this case, the controller 40 executes the second filling control of filling hydrogen into a vehicle 200 from a dispenser 30 without using the vehicle-side hydrogen temperature Tc.

More specifically, the controller 40 executes the second filling control while monitoring the system-side hydrogen pressure and the filling rate SOCs' calculated on the basis of this hydrogen pressure and the substitute value Tc' of the hydrogen temperature without using the hydrogen temperature Tc. In this way, an erroneous stop of hydrogen filling can be prevented even if there is the gas state fluctuation in which the hydrogen temperature decreases. Thus, in the hydrogen filling system 100, hydrogen filling is not stopped before a desired amount of the hydrogen gas is filled into the fuel tank 210 of the vehicle 200 and the hydrogen gas can be efficiently filled into the fuel tank 210.

Further, the controller 40 switches a hydrogen filling process from the second filling control to the first filling control when the reduction amount of the vehicle-side hydrogen temperature is not larger than the second reference reduction amount ΔTb after the start of the second filling control. In the eighth embodiment, the hydrogen temperature reduction amount calculated on the basis of the hydrogen temperature Tc is used not to finish the filling control itself, but to switch from the second filling control to the first filling control.

The filling control process can be returned from the second filling control to the first filling control at a proper timing at which the influence of a hydrogen temperature fluctuation is reduced by determining the switch timing of the filling control not on the basis of the elapse of time, but on the basis of the hydrogen temperature reduction amount as just described. In this way, in the hydrogen filling system 100, a control sequence of hydrogen filling can be quickly returned to the first filling control as a normal control.

Ninth Embodiment

Figure 12:
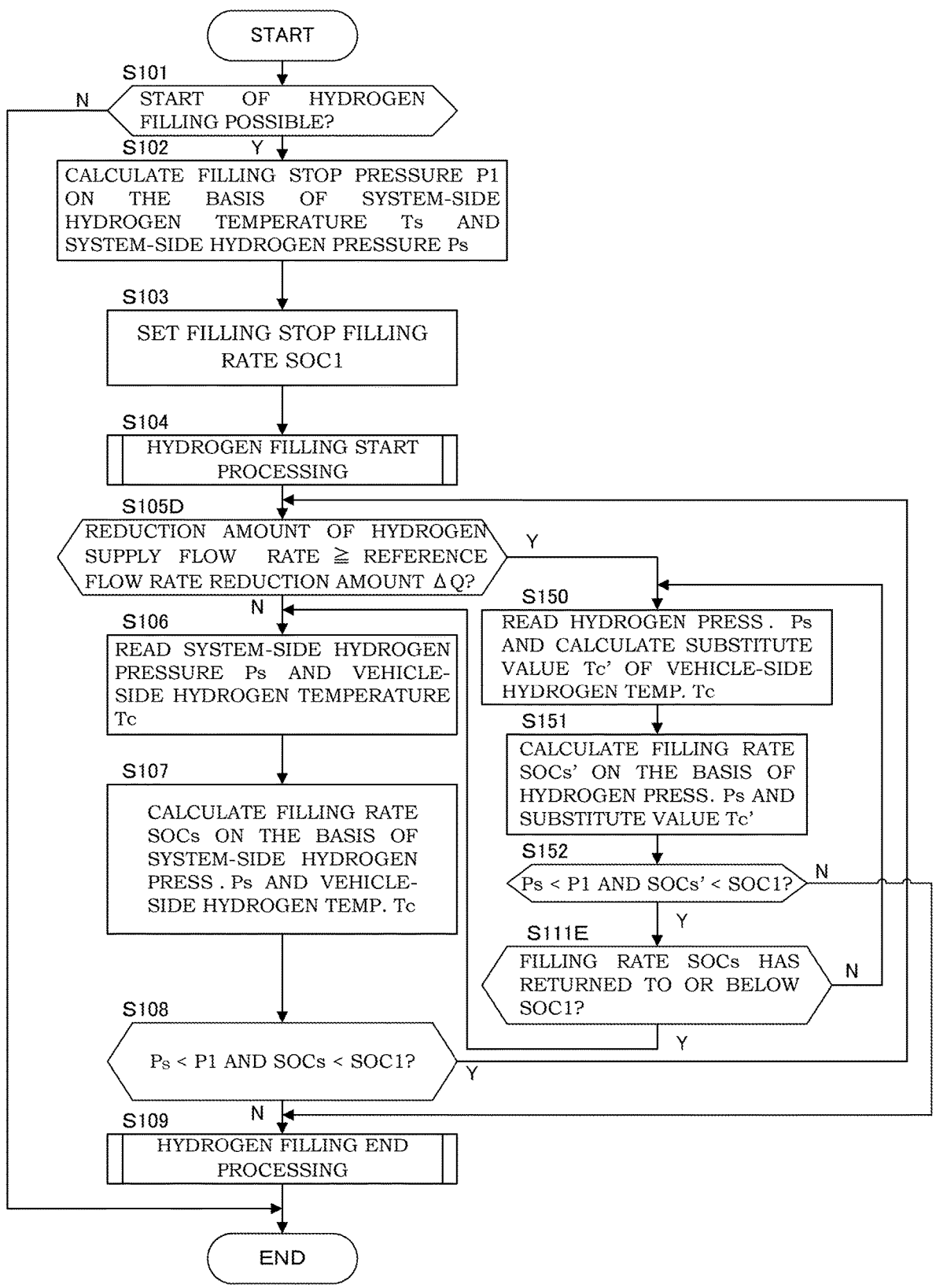
FIG. 12 is a flow chart showing a hydrogen filling control executed by a controller of a hydrogen filling system according to a ninth embodiment.

A hydrogen filling system 100 according to a ninth embodiment of the present invention is described with reference to FIG. 12. FIG. 12 is a flow chart showing a hydrogen filling control executed by a controller 40 of the hydrogen filling system 100 according to the ninth embodiment.

The hydrogen filling system 100 of the ninth embodiment differs from the system of the eighth embodiment in a gas state fluctuation determination process (S105D) and the determination of a switch timing of a second filling control (S111E).

In the ninth embodiment, the controller 40 of the hydrogen filling system 100 performs S105D as the gas state fluctuation determination process after a processing of S104.

If a hydrogen supply flow rate largely decreases due to a certain factor during hydrogen filling, a hydrogen temperature in a fuel tank 210 decreases also by a reduction of the hydrogen supply flow rate. Thus, in S105D, the controller 40 determines whether or not a reduction amount of a supply flow rate Qs of hydrogen supplied to the fuel tank 210 from a dispenser 30 is not smaller than a reference flow rate reduction amount ΔQ.

The reduction amount of the hydrogen supply flow rate is a positive value calculated on the basis of the hydrogen flow rate Qs detected by a flow rate sensor 44 (see FIG. 1) and increases with a reduction of the hydrogen flow rate. The reference flow rate reduction amount ΔQ is set in advance as a value capable of detecting a sudden decrease of the hydrogen temperature in the fuel tank 210 due to a leak determination control and other factors. As just described, S105D is the gas state fluctuation determination process for determining whether or not there is a hydrogen temperature fluctuation (gas state fluctuation) in which the temperature of hydrogen gas in the fuel tank 210 decreases.

When the reduction amount of the hydrogen supply flow rate is smaller than the reference flow rate reduction amount ΔQ, the controller 40 determines that there is no gas state fluctuation due to a hydrogen temperature decrease and performs processes in and after S106. In S106 to S108, the controller 40 executes a first filling control of filling the hydrogen gas while monitoring a hydrogen pressure Ps and a filling rate SOCs calculated on the basis of the hydrogen pressure Ps and a hydrogen temperature Tc.

In contrast, when the reduction amount of the hydrogen supply flow rate is not smaller than the reference flow rate reduction amount ΔQ, the controller 40 successively performs processes of S150 to S152 as in the eighth embodiment. Then, the controller 40 performs a process of S111E after the processing of S152.

S111E is a process relating to the determination of the switch timing of the second filling control. In S111E, the controller 40 determines whether or not the filling rate SOCs calculated on the basis of the system-side hydrogen pressure Ps and the vehicle-side hydrogen temperature Tc has returned to or is below a filling stop filling rate SOC1. That is, the controller 40 determines that the filling rate SOCs has returned to or is below the filling stop filling rate SOC1 when the filling rate SOCs calculated in S111E temporarily exceeds the filling stop filling rate SOC1 and is, thereafter, reduced to or below the filling stop filling rate SOC1.

When the filling rate SOCs is a sufficiently small value even if the hydrogen temperature Tc decreases, the filling rate SOCs does not, in fact, exceed the filling stop filling rate SOC1. Thus, also if the filling rate SOCs is a sufficiently small value, the controller 40 determines that the filling rate SOCs has returned to or is below the filling stop filling rate SOC1.

Unless the filling rate SOCs has returned to or is below the filling stop filling rate SOC1, the controller 40 performs the process of S150 again to continue the second filling control. In contrast, when the filling rate SOCs has returned to or is below the filling stop filling rate SOC1, the controller 40 determines that the hydrogen temperature Tc in the fuel tank 210 has almost stopped decreasing and performs the processes in and after S106 to switch the filling control from the second filling control to the first filling control. In the ninth embodiment, the filling rate SOCs calculated on the basis of the hydrogen pressure Ps and the hydrogen temperature Tc is used not to finish the filling control itself, but to switch from the second filling control to the first filling control.

In the hydrogen filling system 100 according to the ninth embodiment, the controller 40 determines that there is the gas state fluctuation due to a hydrogen temperature decrease when the hydrogen supply flow rate decreases due to a certain factor during hydrogen filling and that reduction amount becomes equal to or larger than the reference flow rate reduction amount ΔQ. In this case, the controller 40 executes the second filling control as in the eighth embodiment without using the vehicle-side hydrogen temperature Tc.

Further, in the hydrogen filling system 100 according to the ninth embodiment, the controller 40 switches a hydrogen filling process from the second filling control to the first filling control when the filling rate SOCs calculated using the system-side hydrogen pressure Ps has returned to or is below the filling stop filling rate SOC1 after the start of the second filling control. The filling control process can be returned from the second filling control to the first filling control at a proper timing at which the influence of a hydrogen temperature fluctuation is reduced by determining the switch timing of the filling control not on the basis of the elapse of time, but on the basis of the filling rate SOCs as just described. In this way, in the hydrogen filling system 100, a control sequence of hydrogen filling can be quickly returned to the first filling control as a normal control.

It should be noted that the present invention is not limited to the above embodiments and it is apparent that various changes can be made within the scope of the technical concept of the present invention.

The hydrogen filling system 100 for filling the hydrogen gas into the vehicle 200 has been illustrated in each of the above embodiments. However, a filling system to which the present invention is applied may be configured as a filling system for filling fuel gas such as natural gas and mixed gas containing hydrogen gas into a vehicle.

Although the storage tanks 20 are divided into three tanks for low pressure, middle pressure and high pressure in each of the above embodiments, these three tanks may be configured as storage tanks having the same specifications set to have a storage upper limit pressure higher than the hydrogen pressure in the fuel tank 210 when the fuel tank 210 is fully filled.

In the hydrogen filling systems 100 of the first to third embodiments, the processing of S111A of FIG. 7 or that of S111B of FIG. 8 may be performed instead of performing the processing of S111 in the hydrogen filling control. Further, in the hydrogen filling systems 100 of the third to sixth embodiments, the processing of S105A of FIG. 4 may be performed instead of performing the processing of S105 in the hydrogen filling control.

In the hydrogen filling systems 100 of the seventh to ninth embodiments, any one of the processings of S105B of FIG. 10, S105C of FIG. 11 and S105D of FIG. 12 may be performed as the gas state determination process. Further, in the hydrogen filling systems 100 of the seventh to ninth embodiments, any one of the processings of S111C of FIG. 10, S111D of FIG. 11 and S111E of FIG. 12 may be performed as a filling process switch determination process.

Although the hydrogen filling systems 100 of the first to ninth embodiments are configured to monitor both the pressure and the filling rate in S108, S132 and S152, they may be configured to monitor either one of the pressure and the filling rate.

The hydrogen filling control of any one of the first to sixth embodiments and the hydrogen filling control of any one of the seventh to ninth embodiments may be configured to be simultaneously executed if necessary.

This application is based on and claims priority to Japanese Patent Application No. 2014-96383, filed in Japan Patent Office on May 7, 2014, the entire content of which is incorporated herein by reference.

The invention claimed is:

1. A fuel gas filling system including a plurality of storage tanks for storing fuel gas and a filling device configured to be selectively connected to the storage tanks and fill the fuel gas supplied from the storage tanks into a fuel tank of a vehicle, comprising:
   a fuel gas state detection unit configured to detect at least one of a pressure of the fuel gas supplied from the filling device or a temperature of the fuel gas in the fuel tank of the vehicle; and
   a controller programmed to:
      determine whether or not there is a gas state fluctuation, the pressure or temperature of the fuel gas supplied from the filling device suddenly changing in the gas state fluctuation;
      execute each one of a first filling control and a second filling control, in the first filling control the fuel gas is filled into the vehicle from the filling device on the basis of at least one of the fuel gas pressure or the fuel gas temperature detected by the fuel gas state detection unit, and in the second filling control the fuel gas is filled into the vehicle according to the gas state fluctuation;
      execute the first filling control in normal time; and
      execute the second filling control of filling the fuel gas without using the fuel gas pressure detected by the fuel gas state detection unit when it is determined that there is the gas state fluctuation caused by the fuel gas pressure during fuel gas filling or executes the second filling control of filling the fuel gas without using the fuel gas temperature detected by the fuel gas state detection unit when it is determined that there is the gas state fluctuation caused by the fuel gas temperature during fuel gas filling.

2. The fuel gas filling system according to claim 1, wherein the controller is programmed to execute the second filling control of filling the fuel gas without monitoring the fuel gas pressure detected by the fuel gas state detection unit and a gas filling rate in the fuel tank calculated from the fuel gas pressure and the fuel gas temperature detected by the fuel gas state detection unit only when it is determined that there is the gas state fluctuation caused by the fuel gas pressure.

3. The fuel gas filling system according to claim 2, further comprising a vehicle-side pressure detection unit configured to detect a fuel gas pressure in the fuel tank of the vehicle, wherein:
the controller is programmed to perform gas filling on the basis of the fuel gas pressure detected by the vehicle-side pressure detection unit during the second filling control.

4. The fuel gas filling system according to claim 3,
wherein the controller is programmed to perform gas filling during the second filling control until the fuel gas pressure in the fuel tank detected by the vehicle-side pressure detection unit reaches a filling stop pressure or a gas filling rate calculated from the fuel gas pressure in the fuel tank detected by the vehicle-side pressure detection unit and the fuel gas temperature detected by the fuel gas state detection unit reaches a filling stop filling rate.

5. The fuel gas filling system according to claim 1,
wherein the controller is programmed to determine that there is the gas state fluctuation caused by the fuel gas pressure when the storage tank connected to the filling device is switched to a different one of the storage tanks.

6. The fuel gas filling system according to claim 1,
wherein the controller is programmed to calculate a pressure fluctuation value on the basis of the fuel gas pressure detected by the fuel gas state detection unit and determines that there is the gas state fluctuation caused by the fuel gas pressure when the pressure fluctuation value is not smaller than a first pressure fluctuation reference value determined in advance.

7. The fuel gas filling system according to claim 1, wherein the controller is programmed to calculate a pressure difference between the fuel gas pressure detected by the fuel gas state detection unit and a filling stop pressure when the storage tank is switched,
wherein the controller is programmed to execute the first filling control when the pressure difference is not larger than a reference pressure difference even if it is determined that there is the gas state fluctuation caused by the fuel gas pressure.

8. The fuel gas filling system according to claim 2,
wherein the controller is programmed to switch from the second filling control to the first filling control when a predetermined time elapses after it is determined that there is the gas state fluctuation.

9. The fuel gas filling system according to claim 2,
wherein the controller is programmed to switch from the second filling control to the first filling control when a pressure fluctuation value calculated on the basis of the fuel gas pressure detected by the fuel gas state detection unit becomes equal to or smaller than a second pressure fluctuation reference value determined in advance after it is determined that there is the gas state fluctuation.

10. The fuel gas filling system according to claim 2,
wherein the controller is programmed to switch from the second filling control to the first filling control when a gas filling rate calculated from the fuel gas pressure and the fuel gas temperature detected by the fuel gas state detection unit returns to or below a filling stop filling rate after temporarily exceeding the filling stop filling rate after it is determined that there is the gas state fluctuation.

11. The fuel gas filling system according to claim 1,
wherein the controller is programmed to execute the second filling control of filling the fuel gas without monitoring a gas filling rate in the fuel tank calculated from the fuel gas temperature and the fuel gas pressure detected by the fuel gas state detection unit only when it is determined that there is the gas state fluctuation caused by the fuel gas temperature.

12. The fuel gas filling system according to claim 11,
wherein the controller is programmed to perform gas filling during the second filling control until the fuel gas pressure detected by the fuel gas state detection unit reaches a filling stop pressure or a gas filling rate in the fuel tank calculated from the fuel gas pressure detected by the fuel gas state detection unit and a substitute value of the fuel gas temperature determined to prevent an erroneous stop of a filling control reaches a filling stop filling rate.

13. The fuel gas filling system according to claim 11, wherein the controller is programmed to execute a leak determination by closing a fuel gas supply path from the filling device to the fuel tank, wherein:
the controller is programmed to determine that there is the gas state fluctuation caused by the fuel gas temperature during the execution of the leak determination.

14. The fuel gas filling system according to claim 11,
wherein the controller is programmed to calculate a temperature reduction amount on the basis of the fuel gas temperature detected by the fuel gas state detection unit and determines that there is the gas state fluctuation caused by the fuel gas temperature when the temperature reduction amount is not smaller than a first temperature reduction amount determined in advance.

15. The fuel gas filling system according to claim 11, further comprising a fuel gas flow rate detection unit configured to detect a flow rate of the fuel gas supplied from the filling device,
wherein the controller is programmed to calculate a flow rate reduction amount on the basis of the fuel gas flow rate detected by the fuel gas flow rate detection unit and determines that there is the gas state fluctuation caused by the fuel gas temperature when the flow rate reduction amount is not smaller than a reference flow rate reduction amount, the reference flow rate reduction amount being a predetermined value detecting the gas state fluctuation in which the fuel gas temperature in the fuel tank suddenly changing.

16. The fuel gas filling system according to claim 11,
wherein the controller is programmed to switch from the second filling control to the first filling control when a predetermined time elapses after it is determined that there is the gas state fluctuation.

17. The fuel gas filling system according to claim 11,
wherein the controller is programmed to switch from the second filling control to the first filling control when a temperature reduction amount calculated on the basis of the fuel gas temperature detected by the fuel gas state detection unit becomes equal to or smaller than a second temperature reduction amount determined in advance after it is determined that there is the gas state fluctuation.

18. The fuel gas filling system according to claim 11,
wherein the controller is programmed to switch from the second filling control to the first filling control when a gas filling rate calculated from the fuel gas pressure and the fuel gas temperature detected by the fuel gas state detection unit returns to or below a filling stop filling rate after temporarily exceeding the filling stop filling rate after it is determined that there is the gas state fluctuation.

19. The fuel gas filling system according to claim 1, wherein the controller is programmed to perform gas filling during the first filling control until the fuel gas pressure detected by the fuel gas state detection unit reaches a filling stop pressure or a gas filling rate in the fuel tank calculated from the fuel gas pressure and the fuel gas temperature detected by the fuel gas state detection unit reaches a filling stop filling rate.

* * * * *